(12) United States Patent
Ha et al.

(10) Patent No.: US 10,539,979 B2
(45) Date of Patent: Jan. 21, 2020

(54) ELECTRONIC DEVICE AND METHOD OF CONTROLLING THE SAME

(71) Applicant: Samsung Electronics Co., Ltd., Suwon-si, Gyeonggi-do (KR)

(72) Inventors: Dohyung Ha, Seoul (KR); Seonghoon Kim, Seoul (KR); Minsung Lee, Suwon-si (KR); Jieun Myung, Seoul (KR); Jisang Park, Yongin-si (KR); Hyungsup Byeon, Suwon-si (KR); Donghyun Yeom, Bucheon-si (KR); Minwoo Yoo, Osan-si (KR); Hyunju Hong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/050,440

(22) Filed: Jul. 31, 2018

(65) Prior Publication Data

US 2019/0041912 A1 Feb. 7, 2019

(30) Foreign Application Priority Data

Aug. 1, 2017 (KR) .................... 10-2017-0097809

(51) Int. Cl.
*G06F 3/041* (2006.01)
*G06F 1/16* (2006.01)
(Continued)

(52) U.S. Cl.
CPC .......... *G06F 1/1643* (2013.01); *G06F 1/1652* (2013.01); *G06F 3/03545* (2013.01);
(Continued)

(58) Field of Classification Search
CPC ...... G06F 3/0488; G06F 3/0416; G06F 3/044; G06F 3/03547; G06F 3/041; G06F 3/04886; G06F 1/169
See application file for complete search history.

(56) References Cited

U.S. PATENT DOCUMENTS 8,416,148 B1 4/2013 Park
9,116,581 B2 * 8/2015 Peng .................. G06F 3/0418
(Continued)

FOREIGN PATENT DOCUMENTS

KR 10-2013-0127288 A 11/2013
KR 10-2014-0085956 A 7/2014
(Continued)

*Primary Examiner* — Dong Hui Liang
(74) *Attorney, Agent, or Firm* — Jefferson IP Law, LLP

(57) ABSTRACT

An electronic device is provided. The electronic device includes a housing including a first plate, a second plate, and a side member, the side member being attached to or integrally formed with at least one of the first plate or the second plate, a display positioned inside the housing and configured to form a display area through the first plate, a first touch panel positioned inside the housing and interposed between the display and the first plate or integrally formed with the display and including a first plurality of sensing elements having a first touch point density, a second touch panel positioned inside the housing, adjacent to the side member, and oriented to face a portion of the side member, and including a second plurality of sensing elements having a second touch point density lower than the first touch point density, and a processor.

12 Claims, 19 Drawing Sheets

(51) Int. Cl.
  *G06F 3/0488* (2013.01)
  *G06F 3/0485* (2013.01)
  *G06F 3/0354* (2013.01)
(52) U.S. Cl.
  CPC .......... *G06F 3/0416* (2013.01); *G06F 3/0485* (2013.01); *G06F 3/04883* (2013.01); *G06F 3/0414* (2013.01)

(56) References Cited

U.S. PATENT DOCUMENTS

| | | | | |
|---|---|---|---|---|
| 2010/0134424 | A1* | 6/2010 | Brisebois | G06F 3/03547 345/173 |
| 2012/0075202 | A1* | 3/2012 | Michaelis | G06F 3/041 345/173 |
| 2013/0141340 | A1* | 6/2013 | Yilmaz | G06F 1/1643 345/173 |
| 2014/0022202 | A1* | 1/2014 | Badaye | G06F 3/044 345/174 |
| 2014/0183473 | A1 | 7/2014 | Lee et al. | |
| 2014/0240289 | A1* | 8/2014 | Myers | H04M 1/0268 345/174 |
| 2014/0347076 | A1* | 11/2014 | Barton | G06F 3/0488 324/663 |
| 2014/0347319 | A1* | 11/2014 | Lin | G06F 3/044 345/174 |
| 2015/0227233 | A1* | 8/2015 | Yi | G06F 3/044 345/174 |
| 2016/0026298 | A1* | 1/2016 | Hashida | G06F 1/16 345/174 |
| 2016/0054832 | A1 | 2/2016 | Kim et al. | |
| 2016/0147375 | A1* | 5/2016 | Bok | G06F 3/0421 345/175 |
| 2016/0234362 | A1 | 8/2016 | Moon et al. | |
| 2017/0031514 | A1* | 2/2017 | Kimura | G06F 3/044 |
| 2018/0046301 | A1* | 2/2018 | Zhou | G06F 3/0412 |

FOREIGN PATENT DOCUMENTS

| | | |
|---|---|---|
| KR | 10-2015-0092524 A | 8/2015 |
| KR | 10-2016-0024425 A | 3/2016 |
| KR | 10-2016-0097106 A | 8/2016 |

\* cited by examiner

ELECTRONIC DEVICE AND METHOD OF CONTROLLING THE SAME

CROSS-REFERENCE TO RELATED APPLICATION(S)

This application is based on and claims priority under 35 U.S.C. § 119(a) of a Korean patent application number 10-2017-0097809, filed on Aug. 1, 2017, in the Korean Intellectual Property Office, the disclosure of which is incorporated by reference herein in its entirety.

BACKGROUND

1. Field

The disclosure relates to an electronic device and a method of controlling the same.

2. Description of the Related Art

With the technical development of electronic devices, services to provide to users increase in various fields with a fast speed. For example, the electronic device may perform various functions such as a camera, email, video reproduction, organizer, messenger, game playing, and audiovisual communication as well as a phone function.

The electronic devices are provided with a touch screen that simultaneously provides a display area and a touch area. In a portable electronic device of a touch screen type, by touching a touch screen using a finger or a stylus pen, a user may control a system, program, and application of the portable electronic device.

Nowadays, a flexible touch screen panel has been appeared that can remain a display performance even when being bent like paper using a flexible substrate of a flexible material such as plastic.

Such a flexible touch screen panel is developed into a bended display form to reduce an outer edge area, for example, a bezel area of an electronic device, and the flexible touch screen panel has a characteristic that a display area can be widened, thus, a commercial value according an aesthetic impression and utility can increase.

However, the flexible touch screen panel has been supplied with a high price, compared with a touch screen panel having a stiff characteristic, and it is difficult to apply the flexible touch screen panel to a cheap electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that can provide simultaneously a display area and a touch area through at least a portion of a first plate thereof and that can provide another touch area through at least a portion of a side surface thereof.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first plate facing a first direction, a second plate facing a second direction opposite to the first direction, and a side member enclosing a space between the first plate and the second plate, the side member being attached to or integrally formed with at least one of the first plate and the second plate, a display positioned inside the housing and configured to form a display area through the first plate, a first touch panel positioned inside the housing and interposed between the display and the first plate or integrally formed with the display, the first touch panel including a first plurality of sensing elements having a first touch point density, a second touch panel positioned inside the housing, the second touch panel being adjacent to the side member and oriented to face a portion of the side member, the second touch panel including a second plurality of sensing elements having a second touch point density lower than the first touch point density, and a processor positioned inside the housing and functionally connected to the display, the first touch panel, and the second touch panel.

In accordance with another aspect of the disclosure, an electronic device is provided. The electronic device includes a display configured to form a front display area, a touch panel layer configured to form a front touch area and a side touch area, the side touch area including sensing elements having a lower density than that of the front touch area, a memory configured to store instructions, and a processor electrically connected to the display, the touch panel layer, and the memory, wherein the processor is configured to set a first designated area of the side touch area to an area corresponding to a first function key, receive a first user input related to the first function key on the side touch area, and in response to the receiving of the first user input, provide a first user interface configured to induce a second user input to the first designated area.

In accordance with another aspect of the disclosure, a method of controlling an operation of an electronic device that includes a front display area, a front touch area, and a side touch area, is provided. The method includes setting a first designated area of the side touch area to an area corresponding to a first function key, receiving a first user input related to the first function key on the side touch area, and in response to the receiving of the first user input, providing a first user interface configured to induce a second user input to the first designated area. The side touch area includes sensing elements with a density lower than that of the front touch area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
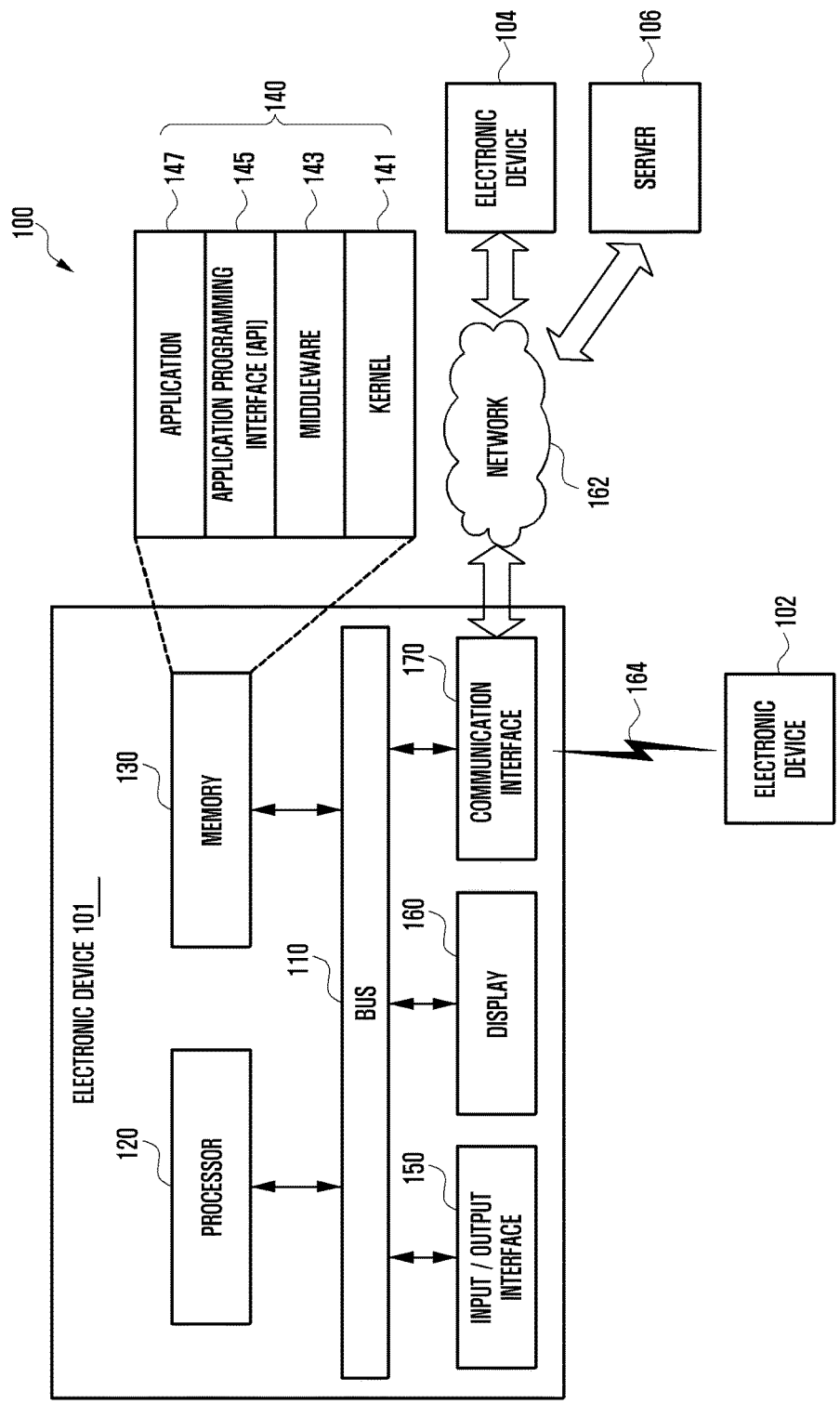
FIG. 1 is a block diagram illustrating a configuration of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expressions "have", "may have", "include", and "may include" refer to the existence of a corresponding feature (e.g., a numeral, a function, an operation, or an element such as a component), and do not exclude one or more additional features.

In the disclosure, the expressions "A or B," "at least one of A and/or B," and "one or more of A and/or B" may include all possible combinations of the items listed. For example, the expressions "A or B," "at least one of A and B," and "at least one of A or B" refer to all of (1) including at least one A, (2) including at least one B, and (3) including all of at least one A and at least one B.

The expressions "a first," "a second," "the first," and "the second" used in various embodiments of the disclosure may modify various components regardless of the order and/or the importance but is not intended to limit the corresponding components. For example, a first user device and a second user device indicate different user devices but are both user devices. For example, a first element may be referred to as a second element, and similarly, a second element may be referred to as a first element without departing from the scope of the disclosure.

It should be understood that when an element (e.g., a first element) is referred to as being (operatively or communicatively) "connected," or "coupled," to another element (e.g., a second element), the element may be directly connected or coupled to the other element or another element (e.g., a third element) may be interposer between them. In contrast, it may be understood that when an element (e.g., a first element) is referred to as being "directly connected," or "directly coupled" to another element (e.g., a second element), there is no element (e.g., a third element) interposed between them.

The expression "configured to" used in the disclosure may be interchangeably used with, for example, the expressions "suitable for," "having the capacity to," "designed to," "adapted to," "made to," and "capable of" according to the situation. The expression "configured to" may not necessarily imply "specifically designed to" in hardware. Alternatively, in some situations, the expression "device configured to" may indicate that the device, together with other devices or components, "is able to". For example, the expression "processor adapted (or configured) to perform A, B, and C" may indicate a dedicated processor (e.g. an embedded processor) for performing only the corresponding operations or a general-purpose processor (e.g., a central processing unit (CPU) or an application processor (AP)) that can perform the corresponding operations by executing one or more software programs stored in a memory device.

The terms used in the disclosure are only used to describe certain embodiments, but are not intended to limit the disclosure. As used herein, singular forms may include plural forms as well unless the context clearly indicates otherwise. Unless defined otherwise, all terms used herein, have the same meanings as those commonly understood by a person skilled in the art to which the disclosure pertains. Terms such as those defined in a generally used dictionary may be interpreted to have the same meanings as the contextual meanings in the relevant field of art, and are not intended to be interpreted to have ideal or excessively formal meanings unless clearly defined in the disclosure. In some cases, even a term defined in the disclosure is not intended to be interpreted to exclude embodiments of the disclosure.

In the disclosure, an electronic device may be a device that includes a communication function. For example, an electronic device may be a smart phone, a tablet personal computer (PC), a mobile phone, a video phone, an electronic (e-book) reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a portable medical device, a digital camera, or a wearable device (e.g., head-mounted device (HMD) such as electronic glasses, electronic clothes, an electronic bracelet, an electronic necklace, an electronic accessory, an electronic tattoo, a smart mirror, or a smart watch).

According to an embodiment of the disclosure, an electronic device may be a smart home appliance that includes a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync®, Apple TV®, Google TV™, etc.), a game console, an electronic dictionary, an electronic key, a camcorder, or an electronic picture frame.

According to an embodiment of the disclosure, an electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, point of sales (POS) devices in a shop, or an internet of things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.)

According to an embodiment of the disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof.

Hereinafter, an electronic device according to an embodiment of the disclosure is described with reference to the accompanying drawings. As used herein, the term "user" may indicate a person who uses an electronic device or a device (e.g., an artificial intelligence electronic device) that uses an electronic device.

FIG. 1 is a block diagram of a network environment including an electronic device according to an embodiment of the disclosure.

Referring to FIG. 1, an electronic device 101, in a network environment 100, includes a bus 110, a processor 120, a memory 130, an input/output interface 150, a display 160, and a communication interface 170. The electronic device 101 may omit at least one of the components or further include another component.

The bus 110 may be a circuit connecting the above described components and transmitting communication (e.g., a control message) between the above described components.

The processor 120 may include one or more of a CPU, an AP and a communication processor (CP). For example, the processor 120 may control at least one component of the electronic device 101 and/or perform a calculation relating to communication or data processing.

The memory 130 may include volatile and/or non-volatile memory. For example, the memory 130 may store a command or data relating to at least one component of the electronic device 101. According to an embodiment of the disclosure, the memory may store software and/or a program 140. For example, the program 140 may include a kernel 141, middleware 143, an application programming interface (API) 145, and/or an application 147 and so on. At least one portion of the kernel 141, the middleware 143 and the API 145 may be defined as an operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function for allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 may be used, to the application 147.

The API 145 is an interface by which the application 147 may control a function provided by the kernel 141 or the middleware 142 and includes, for example, at least one interface or function (e.g., a command) for a file control, a window control, image processing, or a character control.

The input/output interface 150 may be an interface to transmit a command or data inputted by a user or another external device to another component(s) of the electronic device 101. Further, the input/output interface 150 may output a command or data received from another component(s) of the electronic device 101 to the user or another external device.

The display 160 may include, for example, a liquid crystal display (LCD), a light emitting diode (LED), an organic LED (OLED), a micro electro mechanical system (MEMS) display, or an electronic paper display. The display 160 may display, for example, various contents (e.g., text, an image, video, an icon, a symbol, and so on) to a user. The display 160 may include a touch screen, and receive a touch, a gesture, an approaching, or hovering, input using a part of a user's body.

The communication interface 170 may establish communication between the electronic device 101 and an external device (e.g., a first external device 102, a second external device 104, or a server 106). For example, the communication interface 170 may be connected to a network 162 through wireless communication or wire communication and communicate with the second external device 104 or the server 106.

Wireless communication may use, as a cellular communication protocol, at least one of long-term evolution (LTE), LTE Advance (LTE-A), code division multiple access (CDMA), wideband CDMA (WCDMA), universal mobile telecommunications system (UMTS), wireless broadband (WiBro), global system for mobile communications (GSM), and the like, for example. A short-range communication 164 may include, for example, at least one of Wi-Fi, Bluetooth (BT), near field communication (NFC), and global navigation satellite system (GNSS), and the like.

The GNSS may include at least one of, for example, a GPS, a global navigation satellite system (Glonass), a Beidou navigation satellite system (Beidou), and European global satellite-based navigation system (Galileo). Hereinafter, "GPS" may be interchangeably used with t "GNSS". Wired communication may include, for example, at least one of a universal serial bus (USB), a high definition multimedia interface (HDMI), recommended standard-232 (RS-232), plain old telephone service (POTS), and the like. The network 162 may include a telecommunication network, for example, at least one of a computer network (e.g., a local area network (LAN) or a wide area network (WAN)), the internet, and a telephone network.

Each of the first external device 102 and the second external device 104 may be the same or a different type of device than the electronic device 101. According to an embodiment of the disclosure, the server 106 may include one or more group of servers. At least one portion of executions executed by the electronic device 101 may be performed by one or more of the first external device 102, the second external device 104, or server 106. If the electronic device 101 performs a function or service automatically, the electronic device 101 may request that at least one function be performed by the first external device 102, the second external device 104, or the server 106. For the above, cloud computing technology, distributed computing technology, or client-server computing technology may be used, for example.

Figure 2:
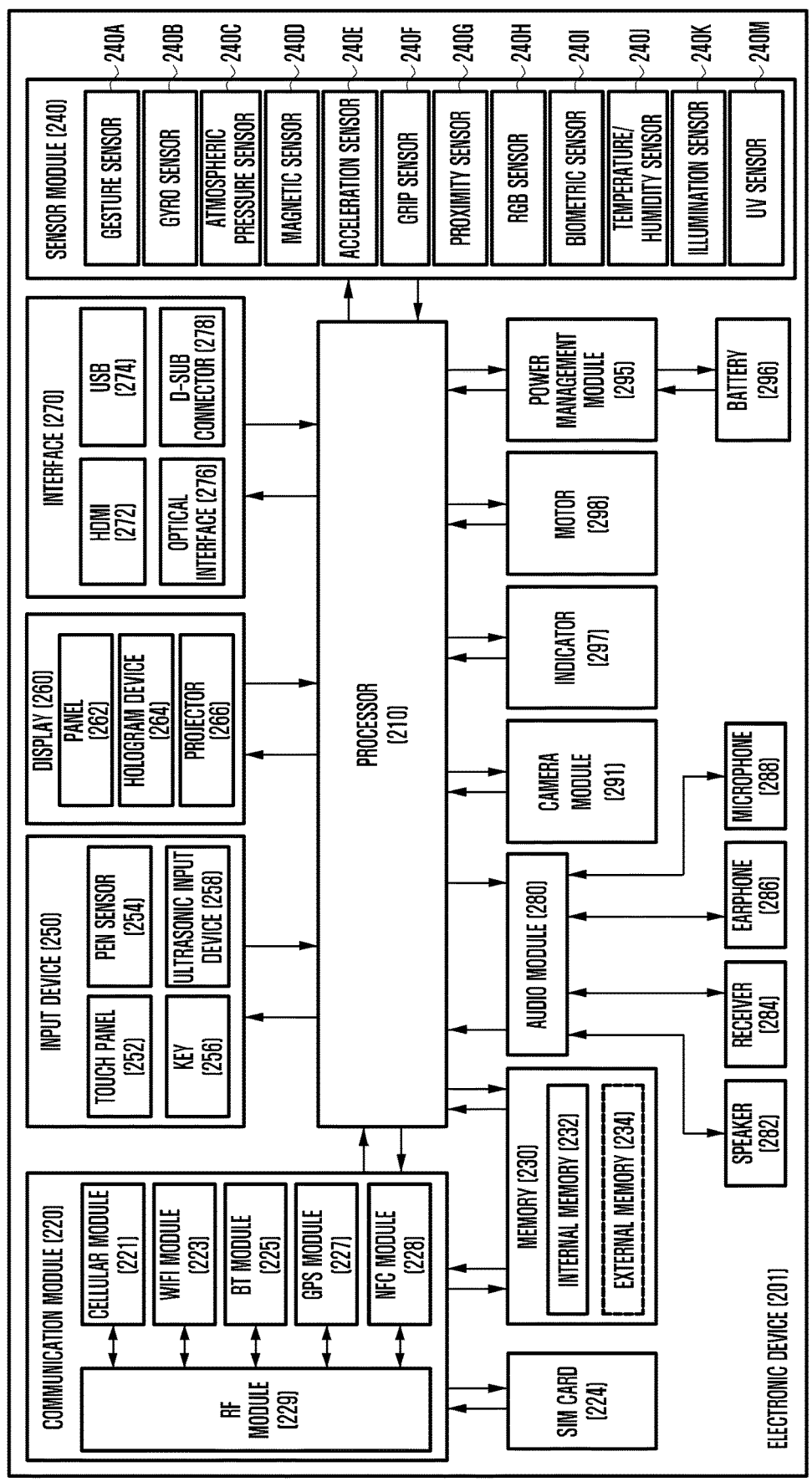
FIG. 2 is a block diagram illustrating a configuration of an electronic device according to an embodiment of the disclosure.

FIG. 2 is a block diagram of an electronic device according to an embodiment of the disclosure.

Referring to FIG. 2, an electronic device 201 may configure, for example, a whole or a part of the electronic device 101 illustrated in FIG. 1. The electronic device 201 includes one or more APs 210 (hereinafter processor), a communication module 220, a subscriber identification module (SIM) card 224, a memory 230, a sensor module 240, an input device 250, a display 260, an interface 270, an audio module 280, a camera module 291, a power managing module 295, a battery 296, an indicator 297, and a motor 298.

The processor 210 operates an OS or an application program so as to control a plurality of hardware or software component elements connected to the processor 210 and executes various data processing and calculations including multimedia data. The processor 210 may be implemented by, for example, a system on chip (SoC). According to an embodiment of the disclosure, the processor 210 may further include a graphics processing unit (GPU) and/or an image signal processor (ISP). The processor 210 may include at least one portion of components illustrated in FIG. 2 (e.g., a cellular module 221). The processor 210 may load a command or data received from at least one other component (e.g., a non-volatile memory), and store various data in the non-volatile memory.

The communication module 220 may include same or similar components as the communication interface 170 of FIG. 1. The communication module 220, for example, may include the cellular module 221, a Wi-Fi module 223, a BT module 225, a GPS module 227, an NFC module 228, and a radio frequency (RF) module 229.

The cellular module 221 provides a voice, a call, a video call, a short message service (SMS), or an internet service through a communication network (e.g., LTE, LTE-A, CDMA, WCDMA, UMTS, WiBro, GSM and the like). Further, the cellular module 221 may distinguish and authenticate electronic devices within a communication network by using a SIM card 224. According to an embodiment of the disclosure, the cellular module 221 performs at least some of the functions which may be provided by the processor 210. For example, the cellular module 221 may perform at least some multimedia control functions. The cellular module 221 may include a CP.

Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are at least some (e.g., two or more) of the cellular module 221, the Wi-Fi module 223, the BT module 225, the GPS module 227, and the NFC module 228, the cellular module 221, the Wi-Fi module 223, the BT module 225, the GPS module 227, and the NFC module 228 may be included in one integrated circuit (IC) or one IC package. For example, at least some (e.g., a CP corresponding to the cellular module 221 and a Wi-Fi processor corresponding to the Wi-Fi module 222 of processors corresponding to the cellular module 221, the Wi-Fi module 223, the BT module 225, the GPS module 227, and the NFC module 228 may be implemented by one SoC.

The RF module 229 transmits/receives data, for example, an RF signal. The RF module 229 may include, for example, a transceiver, a power amplifier module (PAM), a frequency filter, a low noise amplifier (LNA) and the like. Further, the RF module 229 may further include a component for transmitting/receiving electronic waves over a free air space in a wireless communication, for example, a conductor, a conductive wire, and the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to one embodiment of the disclosure.

The SIM card 224 may be inserted into a slot formed in a certain portion of the electronic device 201. The SIM card 224 includes unique identification information (e.g., an integrated circuit card identifier (ICCID)) or subscriber information (e.g., an international mobile subscriber identity (IMSI)).

The memory 230 (e.g., the memory 130) may include an internal memory 232 or an external memory 234. The internal memory 232 may include, for example, at least one of a volatile memory (e.g., a random access memory (RAM), a dynamic RAM (DRAM), a static RAM (SRAM), a synchronous dynamic RAM (SDRAM), and the like), and a non-volatile memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not-and (NAND) flash memory, a not-or (NOR) flash memory, and the like).

According to an embodiment of the disclosure, the internal memory 232 may be a solid state drive (SSD). The external memory 234 may further include a flash drive, for example, a compact flash (CF), a secure digital (SD) card, a micro-SD card, a mini-SD card, an extreme digital (xD) card, or a memory stick. The external memory 234 may be functionally connected to the electronic device 201 through various interfaces. The electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, a barometer or atmospheric pressure (barometric) sensor 240C, a magnetic sensor 240D, an acceleration sensor 240E, a grip sensor 240F, a proximity sensor 240G, a color sensor 240H (e.g., a red, green, and blue (RGB) sensor) 240H, a biometric sensor 240I, a temperature/humidity sensor 240J, an illumination (e.g., light) sensor 240K, and a ultraviolet (UV) sensor 240M. Additionally or alternatively, the sensor module 240 may include, for example, an electronic nose (E-nose) sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one of a capacitive type touch panel, a resistive type touch panel, an infrared type touch panel, and an acoustic wave type touch panel. The touch panel 252 may further include a control circuit. In a capacitive type touch panel, the touch panel 252 may recognize a proximity as well as a direct touch. The touch panel 252 may further include a tactile layer. In this case, the touch panel 252 provides a tactile reaction to a user.

The (digital) pen sensor 254 may be implemented, for example, using a method identical or similar to a method of receiving a touch input of a user, or using a separate recognition sheet. The key 256 may include, for example, a physical button, an optical key, or a key pad. The ultrasonic input device 258 is a device which may detect an acoustic wave by a microphone 288 of the electronic device 201 through an input means generating an ultrasonic signal to identify data and may perform wireless recognition. According to an embodiment of the disclosure, the electronic device 201 receives a user input from an external device (e.g., a computer or a server) connected to the electronic device 201 by using the communication module 220.

The display 260 (e.g., the display 160) includes a panel 262, a hologram device 264, and a projector 266. The panel 262 may be, for example, a LCD or an active matrix OLED (AM-OLED). The panel 262 may be implemented to be, for example, flexible, transparent, or wearable. The panel 262 may be configured by the touch panel 252 and one module. The hologram device 264 provides a stereoscopic image in the air by using the interference of light. The projector 266 projects light on a screen to display an image. For example, a screen may be located inside or outside of the electronic device 201. According to an embodiment of the disclosure, the display 260 may further include a control circuit for controlling the panel 262, the hologram device 264, and the projector 266.

The interface 270 includes, for example, an HDMI 272, a USB 274, an optical interface 276, and a D-subminiature (D-sub) connector 278. The interface 270 may be included in, for example, the communication interface 170 illustrated in FIG. 1. Additionally or alternatively, the interface 270 may include, for example, a mobile high-definition link (MHL) interface, an SD card/multi-media card (MMC), or an Infrared Data Association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288, and the like.

The camera module 291 is a device which may photograph a still image and a video. According to an embodiment of the disclosure, the camera module 291 may include one or more image sensors (e.g., a front sensor or a back sensor), an ISP or a flash (e.g., an LED or xenon lamp).

The power managing module 295 manages power of the electronic device 201. The power managing module 295 may include, for example, a power management integrated circuit (PMIC), a charger IC, or a battery gauge.

The PMIC may be mounted to, for example, in an IC or a SoC. A charging method may be divided into wired and wireless methods. The charger IC charges a battery and prevents an over voltage or an over current from flowing from a charger. According to an embodiment of the disclosure, the charger IC includes a charger IC for at least one of a wired charging method and a wireless charging method. A wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery gauge measures, for example, a remaining quantity of the battery 296, a voltage, a current, or a temperature during charging. The battery 296 may store or generate electricity and supply power to the electronic device 201 by using the stored or generated electricity. The battery 296 may include a rechargeable battery or a solar battery.

The indicator 297 shows certain statuses of the electronic device 201 or a part (e.g., the processor 210) of the electronic device 201, for example, a booting status, a message status, a charging status and the like. The motor 298 converts an electrical signal to a mechanical vibration. The electronic device 201 may include a processing unit (e.g., a GPU) for supporting a module TV. The processing unit for supporting a mobile TV may process, for example, media data according to a standard of digital multimedia broadcasting (DMB), digital video broadcasting (DVB), MediaFlo™ and the like.

Each of the components of the electronic device according to an embodiment of the disclosure may be implemented by one or more components and the name of the corresponding component may vary depending on a type of the electronic device. The electronic device may include at least one of the above described components, a few of the components may be omitted, or additional components may be further included. In addition, some of the components of the electronic device may be combined to form a single entity, and thus may equivalently execute functions of the corresponding components before being combined.

Figure 3:
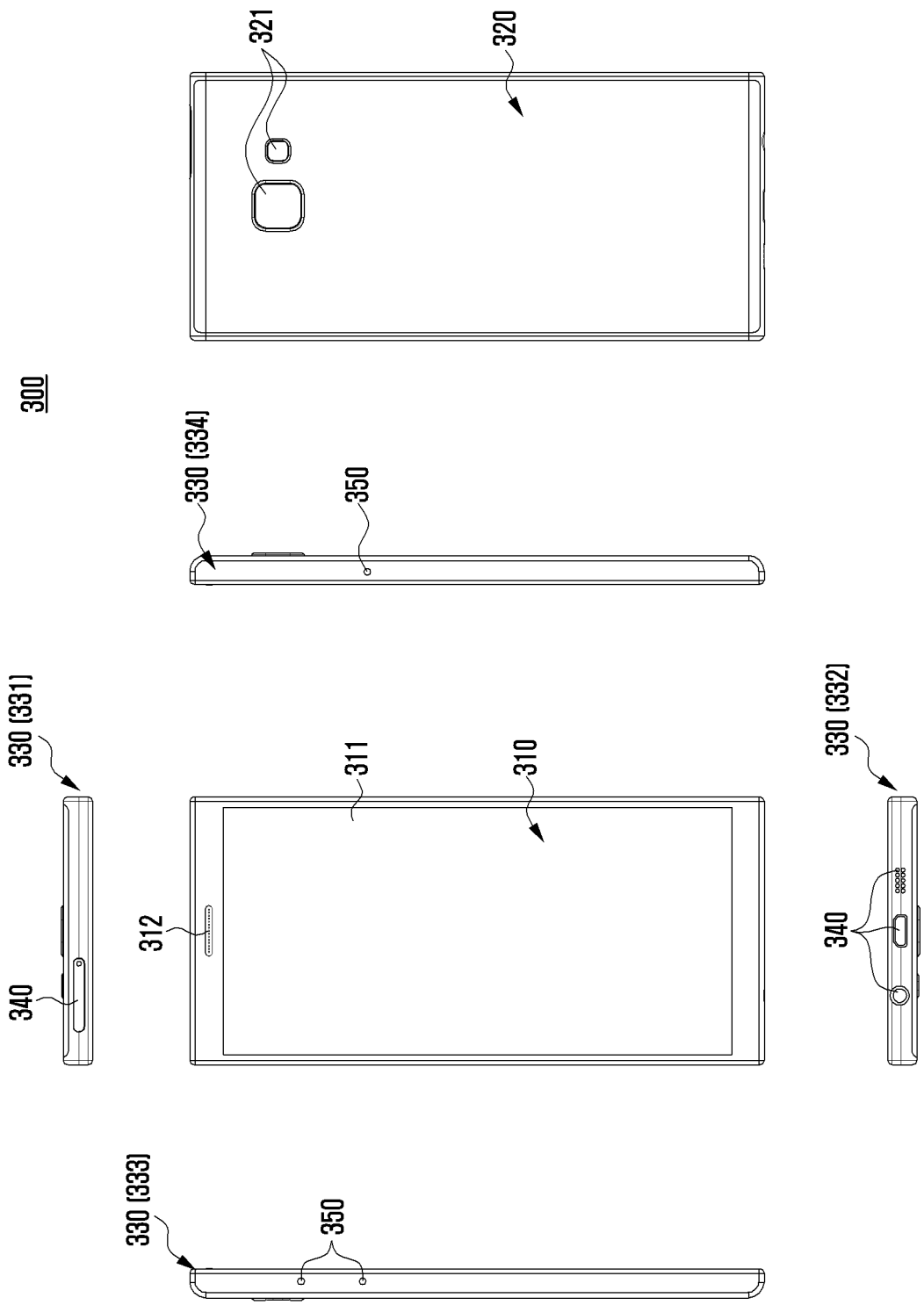
FIG. 3 is a diagram illustrating an outer shape of an electronic device according to an embodiment of the disclosure.

FIG. 3 is a diagram illustrating an outer shape of an electronic device according to an embodiment of the disclosure.

Referring to FIG. 3 illustrates a front view, a rear view, and a side view of an electronic device 300 (e.g., the electronic device 101 of FIG. 1 or the electronic device 201 of FIG. 2) according to various embodiments. According to various embodiments, the electronic device 300 may include a housing including a first plate 310 facing a first direction, a second plate 320 facing a second direction opposite to the first direction, and a side member 330 (e.g., an upper side member 331, a lower side member 332, a left side member 333, and a right side member 334) enclosing a space between the first plate 310 and the second plate 320. According to an embodiment, the side member 330 may be attached to or integrally formed with at least one of the first plate 310 and the second plate 320.

According to various embodiments, at least a partial space of the first plate 310 may include a display area and/or a front touch area. For example, the electronic device 300 may have a front touch area to expose a display 311 through the first plate 310. The display 311 may include, for example, a touch screen or touch panel to perform a function of displaying an image and an input function by a user touch and form a display area and/or a front touch area in at least a partial space of the first plate 310. As another example, the electronic device 300 may expose a first interface 312, for example, at least one of a speaker, sensor, camera, and key button in at least another partial space (e.g., a non-display area) of the first plate 310 in which the display 311 is not disposed.

According to various embodiments, the first plate 310 including a display area and/or a front touch area may include a member of a transparent material. For example, the first plate 310 may be made of plastic or glass of a transparent material, except for a space in which the first interface 312 is exposed.

According to various embodiments, the second plate 320 may expose a second interface 321, for example, at least one of a camera, a sensor, and a flash through at least a partial space.

According to various embodiments, at least a portion of the second plate 320 that does not include a display area and/or a touch area may be formed with a considerably opaque member (e.g., metal, plastic, glass, or leather) or a transparent member (e.g., glass or plastic), except for a space in which the second interface 321 is exposed. According to an embodiment, although not shown, at least a partial space of the second plate 320 may include a display area and/or a touch area.

According to various embodiments, at least one side member 330 (e.g., the upper side member 331 and the lower side member 332) may expose a third interface 340, for example, at least one of a speaker, microphone, external device connection interface, and SIM interface. As another example, at least another side member (e.g., the left side member 333 and the right side member 334) that does not expose the third interface 340 may include a side touch area.

According to various embodiments, the at least another side member (e.g., the left side member 333 and the right side member 334) including a side touch area may be made of a transparent material. For example, the first plate may be made of glass, and the at least another side member (e.g., the left side member 333 and the right side member 334) may be formed integrally with the first plate and be made of glass. As another example, at least one side member (e.g., the upper side member 331 and the lower side member 332) for exposing the third interface 340 may be formed integrally with the second plate 320 and be made of the same material. As another example, at least a portion of the side member 330 for exposing the third interface 340 may be made of a material different from that of the first plate 310 or the second plate 320. However, the disclosure is not limited thereto and all side members (e.g., the upper side member 331, the lower side member 332, the left side member 333, and the right side member 334) may be formed integrally with the first plate 310 and be made of glass.

According to various embodiments, the side touch area may include an indicator 350 that enables the user to intuitively recognize. For example, by embossing molding or engraving molding a position corresponding to the side touch area of the transparent window, the user may recognize the side touch area. As another example, by disposing a light source at a position corresponding to the side touch area, the user may recognize the side touch area.

Figure 4:
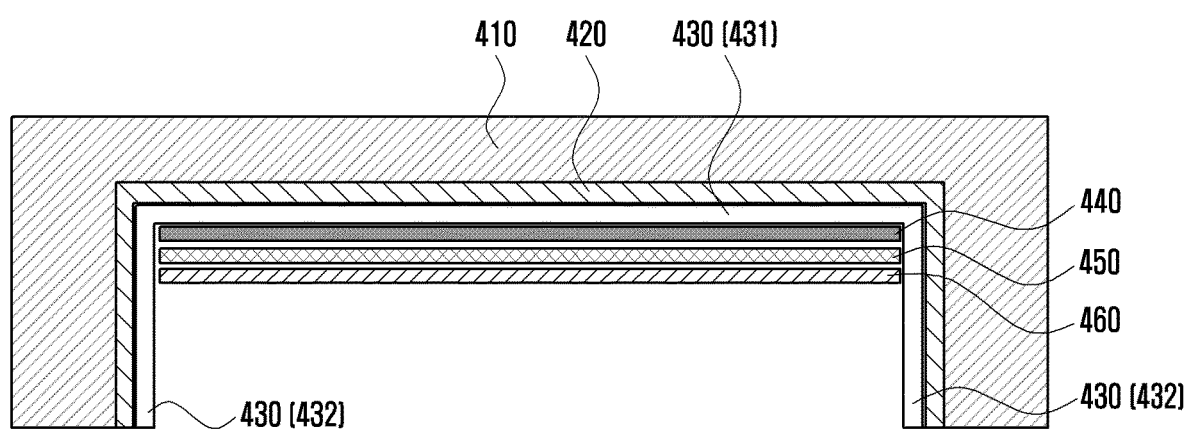
FIG. 4 is a diagram illustrating an internal configuration of an electronic device according to various embodiments of the disclosure.

FIG. 4 is a diagram illustrating an internal configuration of an electronic device according to various embodiments of the disclosure.

Referring to FIG. 4, the electronic device (e.g., the electronic device 300 of FIG. 3) may include a window 410, a first adhesive layer 420, a touch panel layer 430, a second adhesive layer 440, a polarizing film 450, and a display panel 460. In some embodiments, the electronic device (e.g., the electronic device 300 of FIG. 3) may omit at least one of the components or may further include other components.

According to various embodiments, the window 410 may enclose at least a portion of a first plate (e.g., the first plate 310 of FIG. 3) and a side member (the side member 330 of FIG. 3) and be included as a portion of the housing. For example, the window 410 may be formed in a shape enclosing at least a portion of a first plate (e.g., the first plate 310 of FIG. 3), a left side member (e.g., the left side member 333 of FIG. 3), and a right side member (e.g., the right side member 334 of FIG. 3) of the electronic device (e.g., the electronic device 300 of FIG. 3). The window 410 may perform a function of protecting components within the electronic device (e.g., the electronic device 300 of FIG. 3). The window 410 may be made of, for example, glass, poly carbonate (PC), polymethylmethacrylate (PMMA), or polyimide (PI).

FIG. 4 illustrates that a corner of the window 410 has a shape bent in a right angle in which the first plate (e.g., the first plate 310 of FIG. 3) and the side member (e.g., the side member 330 of FIG. 3) meet, but the disclosure is not limited thereto and a corner in which the first plate and the side member meet is bent in a smooth curved shape; thus, a boundary of the first plate and the side member may have a vague shape. As another example, FIG. 4 illustrates a shape enclosing the first plate and the side member using a single window (e.g., the window 410), but at least two separated windows may be coupled to enclose the first plate and the side member.

According to various embodiments, the touch panel layer 430 may be coupled to the inside of the window 410 and form a front touch area of at least a portion of the first plate (e.g., the first plate 310 of FIG. 3) of the electronic device 300 and a side touch area of at least a portion of the side member (e.g., the side member 330 of FIG. 3).

The touch panel layer 430 may include, for example, a second touch panel 432 interposed between the window 410 and the first plate (e.g., the first plate 310 of FIG. 3) or positioned inside the housing close to the side member (e.g., the side member 330 of FIG. 3) and a first touch panel 431 formed integrally with the window 410 and oriented to face a portion of the side member. According to an embodiment, the first touch panel 431 and the second touch panel 432 may have a shape in which an indium tin oxide (ITO) electrode is formed on a single film. In this case, in the first touch panel 431 and the second touch panel 432, a density of the sensing elements may be disposed differently. In some embodiments, by forming each of the first touch panel 431 and the second touch panel 432 on individual separated films and by coupling the each film, the touch panel layer 430 may be formed.

According to various embodiments, the first touch panel 431 may form a front touch area, and the second touch panel 432 may form a side touch area.

According to various embodiments, the first touch panel 431 may include a first plurality of sensing elements with a first touch point density, and the second touch panel 432 may include a second plurality of sensing elements with a second touch point density lower than the first touch point density. For example, the front touch area may have a touch sensing resolution higher than that of the side touch area.

According to various embodiments, the first touch panel 431 may be made of, for example, a light transmissive material and transmit an image signal displayed through the display panel 460.

According to various embodiments, the touch panel layer 430 may include a flexible touch panel in which an ITO electrode is formed in a flexible material (e.g., a flexible transparent film). According to another embodiment, the touch panel layer 430 may include a window integrated touch panel in which an electrode is implemented at the inside of the window 410.

According to various embodiments, the touch panel layer 430 may use various methods such as a capacitance type, resistive overlay type, pressure type, infrared beam type, or surface acoustic wave type.

According to various embodiments, the display panel 460 may be coupled to the inside of the touch panel layer 430 and form a display area through at least a portion of the first plate (e.g., the first plate 310 of FIG. 3). The display panel 460 may include, for example, an LCD panel or an OLED panel.

According to various embodiments, the first adhesive layer 420 may provide adhesive strength to couple the window 410 and the touch panel layer 430 (e.g., the first touch panel 431 and/or the second touch panel 432). According to various embodiments, the second adhesive layer 440 may provide adhesive strength to couple the touch panel layer 430 (e.g., the first touch panel 431 and/or the second touch panel 432) and the display panel 460. The first adhesive layer 420 and/or the second adhesive layer 440 may include an intermediate material having excellent visibility, for example, an optical clear adhesive (OCA) or an optical clear resin (OCR). According to an embodiment, the first adhesive layer 420 and/or the second adhesive layer 440 may be omitted according to an embodiment.

According to various embodiments, the polarizing film 450 may separate and pass through or block vertical or horizontal polarized waves of light emitted from the display panel 460. The intensity of light coming out from the display panel 460 is equal in all directions, but the polarizing film 450 may perform a function of transmitting only light that vibrates in the same direction as that of a polarization axis among the light and absorbing or reflecting the other light to generate polarized light of a specific direction.

Figure 5A:
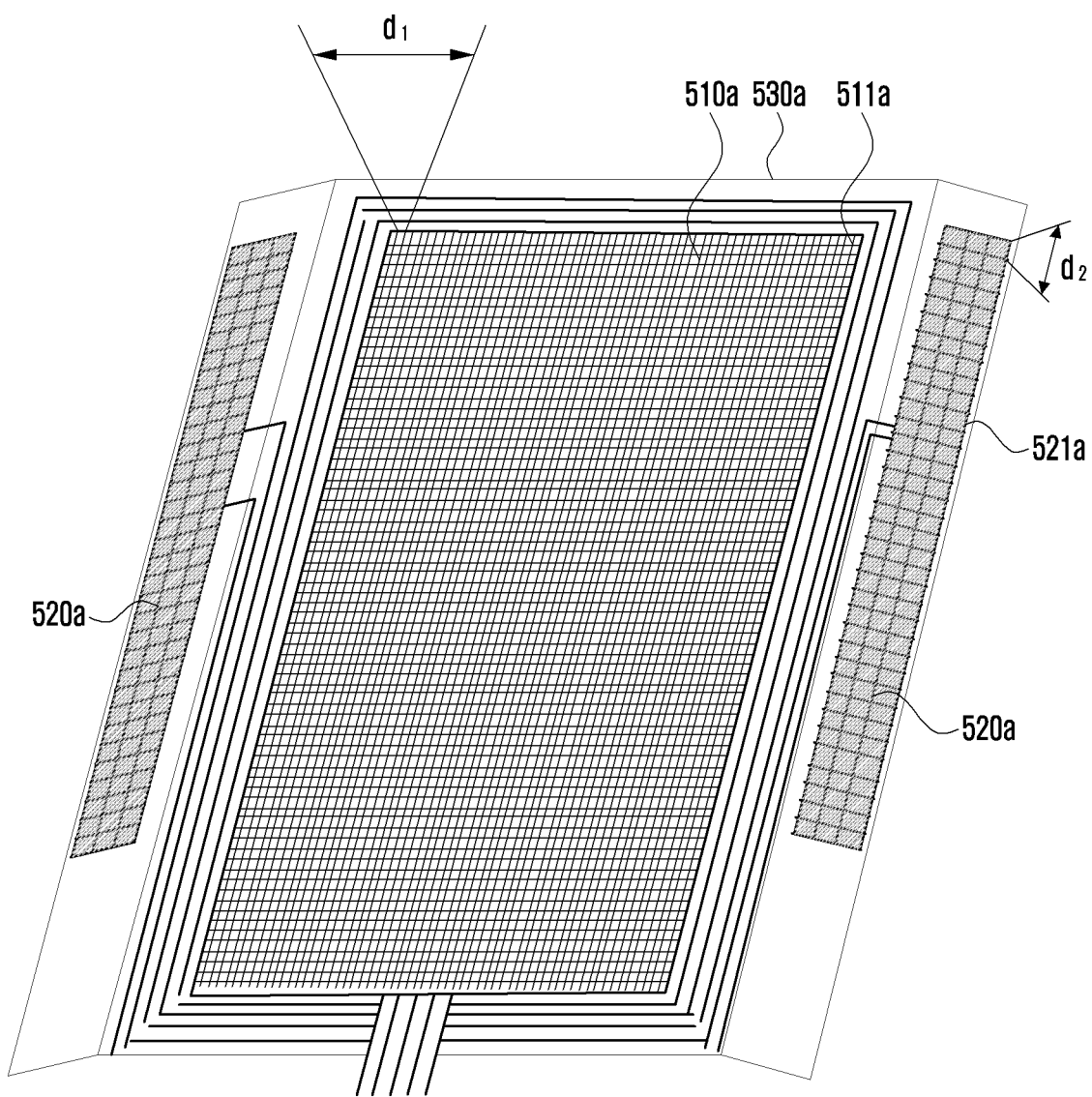
FIGS. 5A and 5B are diagrams illustrating an internal configuration of an electronic device according to various embodiments of the disclosure.
Figure 5B:
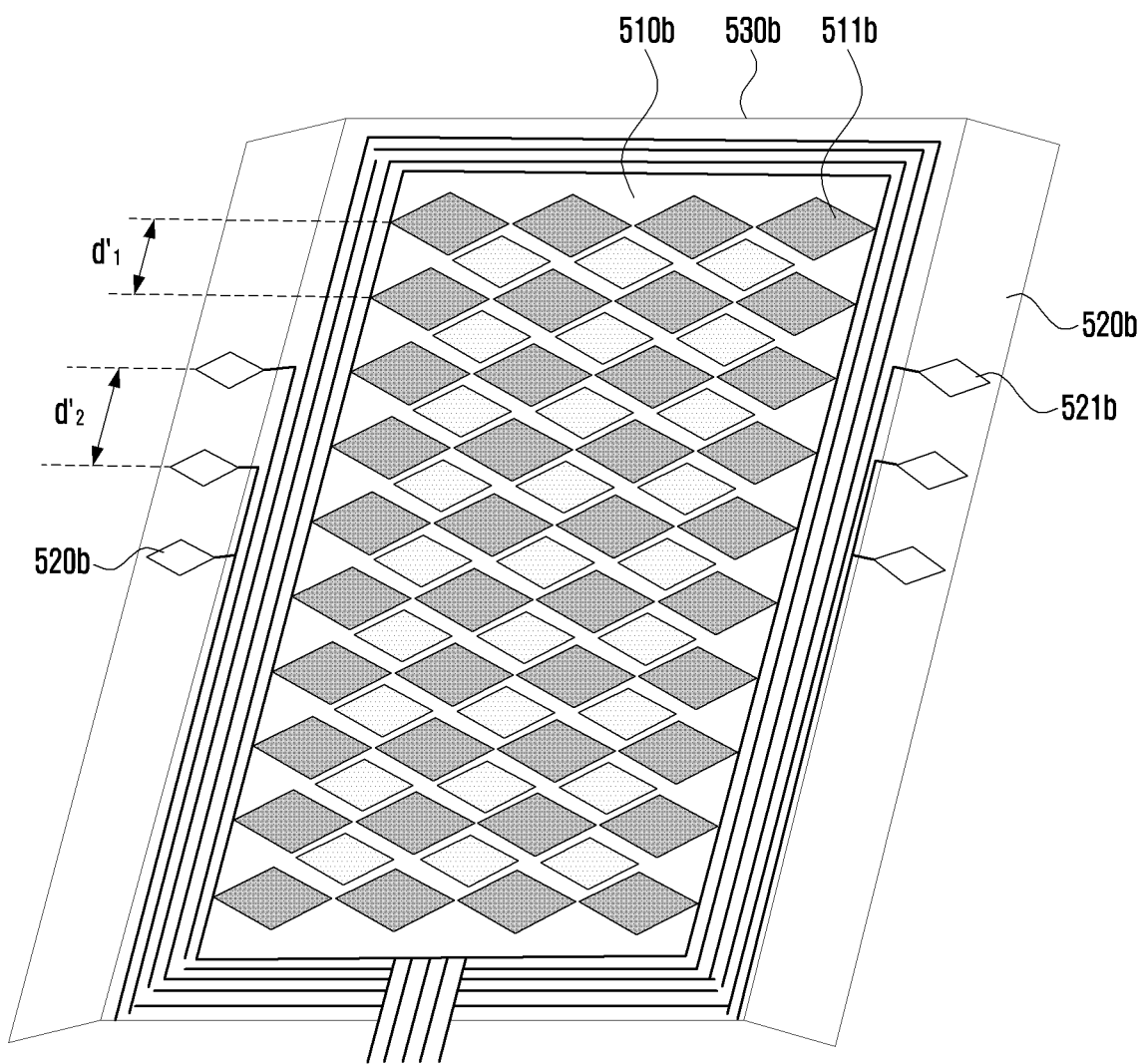

FIGS. 5A and 5B are diagrams illustrating a touch panel layer according to various embodiments of the disclosure.

When the touch panel layer (e.g., the touch panel layer 430 of FIG. 4) includes a capacitance type touch panel layer, the touch panel layer may include at least one of a mutual-capacitance type touch panel and a self-capacitance type touch panel.

Referring to FIG. 5A, a touch panel layer (e.g., the touch panel layer 430 of FIG. 4) according to an embodiment may be formed by forming a first touch panel 510a and a second touch panel 520a on a single film 530a with a mutual capacitance method. The mutual capacitance method may be a method in which a transmitter electrode and a receiver electrode are driven simultaneously with a separated state to read coordinates.

According to various embodiments, the touch panel layer (e.g., the touch panel layer 430 of FIG. 4) may include the first touch panel 510a (e.g., the first touch panel 431 of FIG. 4) including a first plurality of sensing elements with a first touch point density and the second touch panel 520a (e.g., the second touch panel 432 of FIG. 4) including a second plurality of sensing elements with a second touch point density lower than the first touch point density. For example, the first plurality of sensing elements may include a first plurality of conductive lines 511a separated from each other by a first distance d1, and the second plurality of sensing elements may include a second plurality of conductive lines 521a separated from each other by a second distance d2 larger than the first distance d1. For example, the first touch panel 510a and the second touch panel 520a may have different touch sensing resolutions.

Referring to FIG. 5B, a touch panel layer (e.g., the touch panel layer 430 of FIG. 4) according to an embodiment may be formed by forming a first touch panel 510b and a second touch panel 520b on a single film 530b with a self-capacitance method. The self-capacitance method may be a method of finding an electrode in which a current change is detected by arranging electrodes with a method of X-Y or a grid and by sequentially inputting an AC signal through a conductive line connected to each electrode.

According to various embodiments, the touch panel layer may include the first touch panel 510b (e.g., the first touch panel 431 of FIG. 4) including a first plurality of sensing elements with a touch point density and the second touch panel 520b (e.g., the second touch panel 432 of FIG. 4) including a second plurality of sensing elements with a second touch point density lower than the first touch point density. For example, the first plurality of sensing elements may include a first plurality of sensing electrodes 511b separated by a first distance d1', and the second plurality of sensing elements may include a second plurality of sensing electrodes 521b separated by a second distance d2' larger than the first distance d1'. For example, the first touch panel 510b and the second touch panel 520b may have different touch sensing resolutions.

Figure 6:
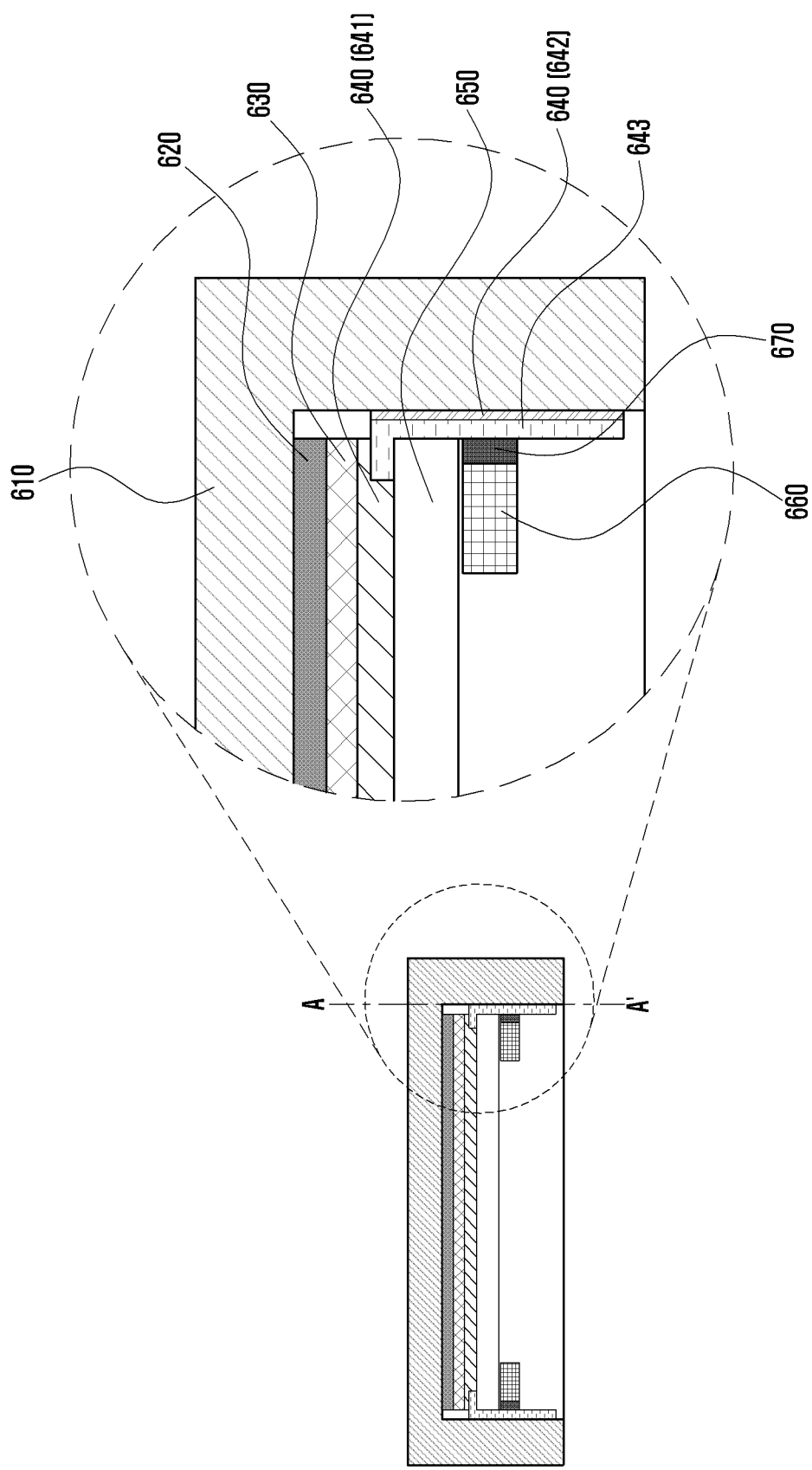
FIG. 6 is a diagram illustrating a flexible printed circuit board according to various embodiments of the disclosure.

FIG. 6 is a diagram illustrating an internal configuration of an electronic device according to various embodiments of the disclosure.

Referring to FIG. 6, the electronic device (e.g., the electronic device 300 of FIG. 3) may include a window 610, a first adhesive layer 620, a polarizing film 630, a touch panel layer 640, a display panel 650, a light source 660, and a waveguide 670. In some embodiments, the electronic device may omit at least one of the components or may further include other components.

The window 610, the first adhesive layer 620, the polarizing film 630, and the display panel 650 are substantially the same as the window 410, the first adhesive layer 420, the polarizing film 450, and the display panel 460, respectively, of FIG. 4; therefore, a detailed description thereof will be omitted.

According to various embodiments, the touch panel layer 640 may be coupled to the inside of the window 610 and may form a front touch area of at least a portion of a first plate (e.g., the first plate 310 of FIG. 3) of the electronic device (e.g., the electronic device 300 of FIG. 3) and a side touch area of at least a portion of the side member (e.g., the side member 330 of FIG. 3).

The touch panel layer 640 may include, for example, a second touch panel 642 interposed between the window 610 and the first plate (e.g., the first plate 310 of FIG. 3) or positioned inside the housing close to a side member (e.g., the side member 330 of FIG. 3) and a first touch panel 641 formed integrally with the window 610, and oriented toward a portion of the side member.

According to various embodiments, the touch panel layer 640 may further include a flexible printed circuit board (FPCB) 643 including the second touch panel 642. For example, the touch panel layer 640 may include the FPCB 643 including the first touch panel 641 corresponding to at least a portion of the first plate (e.g., the first plate 310 of FIG. 3) and the second touch panel 642 corresponding to at least a portion of the side member (e.g., the side member 330 of FIG. 3).

According to various embodiments, in order to form a front touch area at a position corresponding to at least a portion of a first plate (e.g., the first plate 310 of FIG. 3), the first touch panel 641 may include a touch panel that does not have a curve and in which an ITO electrode is formed in a film (e.g., glass) of a stiff material.

According to various embodiments, the FPCB 643 may form a side touch area on at least a partial area of the side member (e.g., the side member 330 of FIG. 3). The FPCB 643 may include, for example, at least one of the touch sensor (or the pressure sensor) and the fingerprint sensor.

According to various embodiments, the light source 660 may be disposed at a position (e.g., a side touch area) corresponding to at least one of a touch sensor (or a pressure sensor) and a fingerprint sensor and may emit light through the side member (e.g., the side member 330 of FIG. 3). For example, the user may recognize a point at which touch recognition or fingerprint recognition is available through at least a partial area of the side member in which light is emitted. According to various embodiments, the light source 660 may include at least one of an incandescent lamp, a discharge lamp, and a LED.

According to various embodiments, the waveguide 670 may enable light emitted from the light source 660 to be emitted to a predetermined path. For example, the waveguide 670 may use a polycarbonate (PC) (long glass fiber (LGF)) sheet. According to an embodiment, the waveguide 670 is printed in a shape (e.g., icon shape) corresponding to a specific function and enables light emitted from the light source 660 to have a pattern shape. According to an embodiment, the waveguide 670 may further include a shielding member in order to block the remaining light other than light emitted through a side surface.

According to various embodiments, an area corresponding to a position (e.g., a side touch area) corresponding to at least one of a touch sensor and a fingerprint sensor may include an indicator (e.g., the indicator 350 of FIG. 3) in order to enable the user to intuitively recognize.

Figure 7:
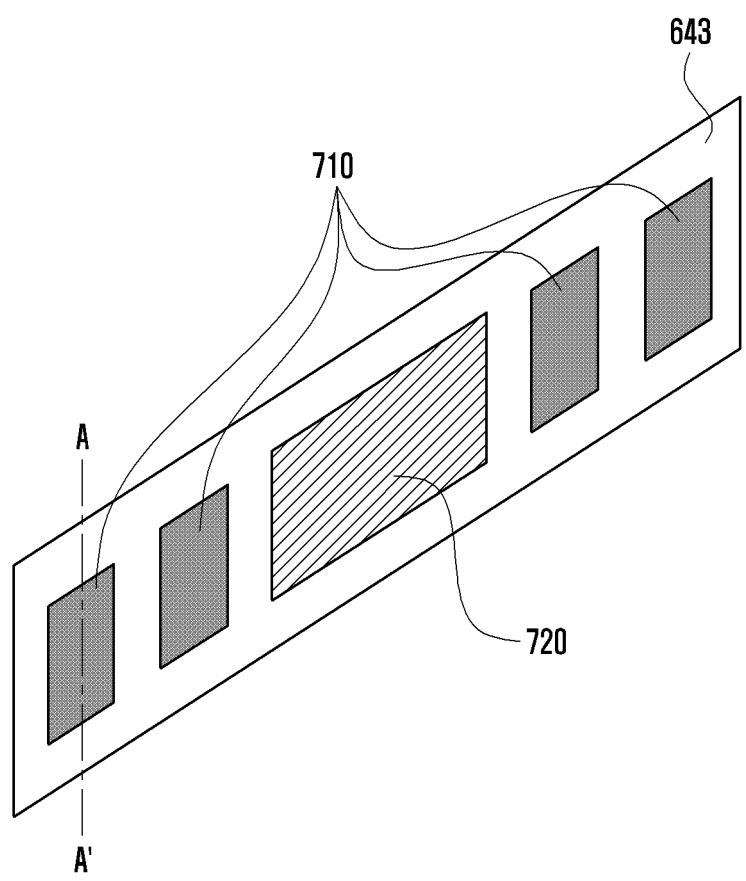
FIG. 7 is a diagram illustrating a touch sensor according to various embodiments of the disclosure.

FIG. 7 is a diagram illustrating an FPCB according to various embodiments of the disclosure.

Referring to FIG. 7, the FPCB 643 may include at least one of a touch sensor (or a pressure sensor) 710 and a fingerprint sensor 720. For example, the touch sensor (or the pressure sensor) 710 may include at least one of a touch sensor, pressure sensor, or touch/pressure sensor.

According to various embodiments, the touch sensor (or the pressure sensor) 710 may form, for example, a side touch area and detect a touch input or a pressure generated on the side touch area. The touch sensor (or the pressure sensor) 710 may include at least some of configurations and/or functions of a first touch panel (e.g., the first touch panel 641 of FIG. 6). As another example, the touch sensor (or the pressure sensor) 710 may use various methods such as a capacitance type, resistive overlay type, pressure type, infrared beam type, or surface acoustic wave type.

According to various embodiments, the fingerprint sensor 720 may obtain the user's fingerprint information. The fingerprint sensor 720 may be implemented into an optical fingerprint sensor capable of obtaining a fingerprint image, but the disclosure is not limited thereto. Fingerprint information obtained from the fingerprint sensor 720 may be stored as image information and be used for authenticating a user by comparing with registered fingerprint information. According to an embodiment, the fingerprint sensor 720 may be formed in the same area as or an area adjacent to that of at least one touch sensor (or the pressure sensor) (e.g., the touch sensor (or the pressure sensor 710). Accordingly, when a touch input occurs in the side touch area, the touch sensor (or the pressure sensor) 710 may obtain touch information and at the same time, the fingerprint sensor 720 may obtain fingerprint information.

According to various embodiments, when a fingerprint recognition function is activated, for example, if an unlock action or a security setting execution such as a message application is executed, the fingerprint sensor 720 may be activated. According to another embodiment, when a fingerprint recognition function is activated and when a touch input occurs on an area of the fingerprint sensor 720, the fingerprint sensor 720 may be activated.

Figure 8:
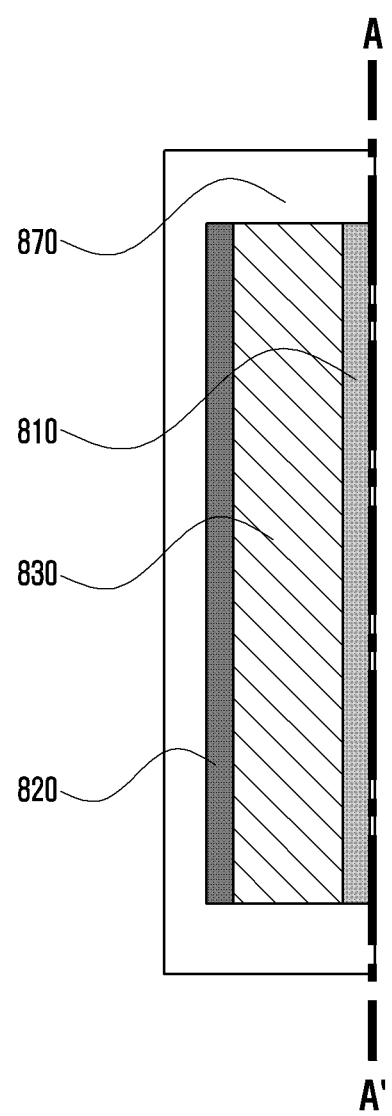
FIG. 8 is a diagram illustrating a side surface of an electronic device according to various embodiments of the disclosure.

FIG. 8 illustrates a pressure sensor of an FPCB taken along line A-A' of FIG. 7 according to various embodiments of the disclosure.

Referring to FIG. 8, the pressure sensor 870 (e.g., the touch sensor (or the pressure sensor) 710 of FIG. 7) may include a first electrode 810, a second electrode 820, and a dielectric layer 830 disposed between the first electrode 810 and the second electrode 820. According to various embodiments, the first electrode 810 and the second electrode 820 may be disposed at a position perpendicular to the side touch area and detect a change of a capacitance formed between the first electrode 810 and the second electrode 820 to detect a position and/or a pressure of the touch. For example, a capacitance formed between the first electrode 810 and the second electrode 820 may be inversely proportional to a distance between the first electrode 810 and the second electrode 820. For example, when the touch pressure increases, a gap between the first electrode 810 and the second electrode 820 may decrease and a capacitance may increase. For example, when a capacitance increases, it may be recognized that a touch by a large pressure has occurred. According to an embodiment, in order to sensitively recognize a touch pressure, the first electrode 810 may be mounted in an outermost layer of the FPCB formed in multiple layers. As another example, the dielectric layer 830 having an elastic force and a restoring force may be disposed between the first electrode 810 and the second electrode 820. According to various embodiments, the dielectric layer 830 may include at least one of silicon, air, foam, a membrane, an optical adhesive film, sponge, rubber, ink, and polymer (PC, polyethylene terephthalate (PET), etc.).

Figure 9:
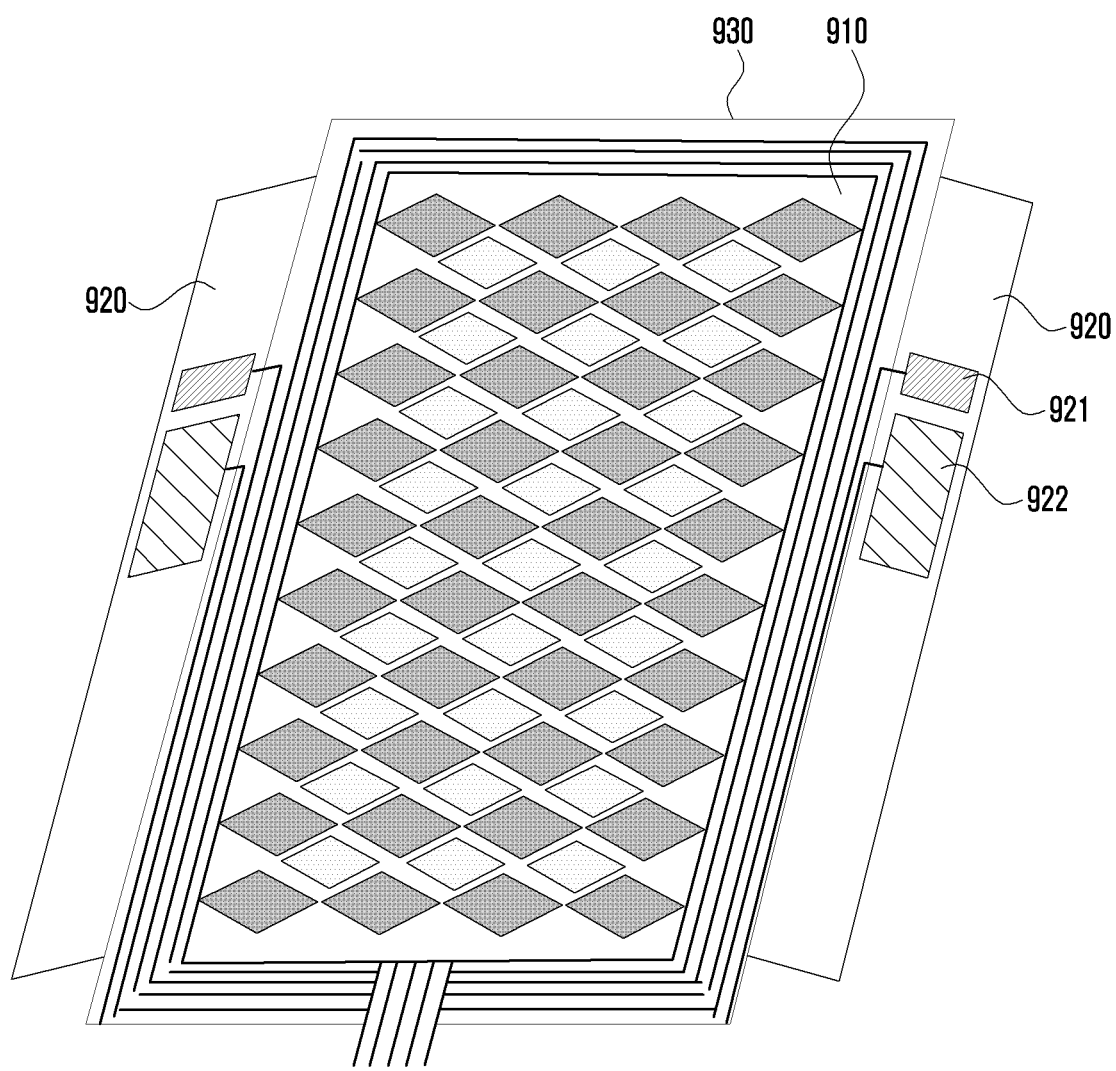
FIG. 9 is a diagram illustrating a method of controlling an electronic device according to various embodiments of the disclosure.

FIG. 9 is a diagram illustrating a touch panel layer according to various embodiments of the disclosure.

Referring to FIG. 9, a touch panel layer (e.g., the touch panel layer 640 of FIG. 6) may include an FPCB 920 (e.g., the FPCB 643 of FIG. 6) including a first touch panel 910 (e.g., the first touch panel 641 of FIG. 6) and a second touch panel (e.g., the second touch panel 642 of FIG. 6) corresponding to at least a portion of the side member (e.g., the side member 330 of FIG. 3).

According to various embodiments, the first touch panel 910 does not substantially have a curvature and may have a shape in which an ITO electrode is formed in a film 930 (e.g., glass) of a stiff material. The first touch panel 910 may include, for example, a mutual-capacitance type touch panel or a self-capacitance type touch panel.

According to various embodiments, a touch panel layer may further include the FPCB 920 including a second touch panel. For example, the FPCB 920 may include at least one of a touch sensor (or a pressure sensor) 921 (e.g., the touch sensor (or the pressure sensor) 710 of FIG. 7) and a fingerprint sensor 922 (e.g., the fingerprint sensor 720 of FIG. 7). The touch sensor (or the pressure sensors) 921 may include at least some of configurations and/or functions of the first touch panel 910. As another example, the touch sensor (or the pressure sensor) 921 may use various methods such as a capacitance type, resistive overlay type, pressure type, infrared beam type, or surface acoustic wave type. The fingerprint sensor 922 may obtain the user's fingerprint information. The fingerprint sensor 922 may be implemented into an optical fingerprint sensor capable of obtaining a fingerprint image, but the disclosure is not limited thereto.

Figure 10A:
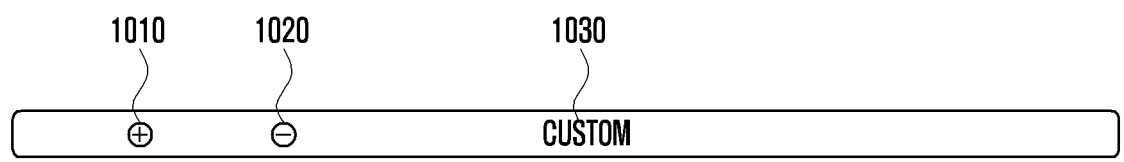
FIGS. 10A and 10B are diagrams illustrating a method of controlling an electronic device to perform different operations according to a magnitude of a touch pressure according to an embodiment of the disclosure.
Figure 10B:
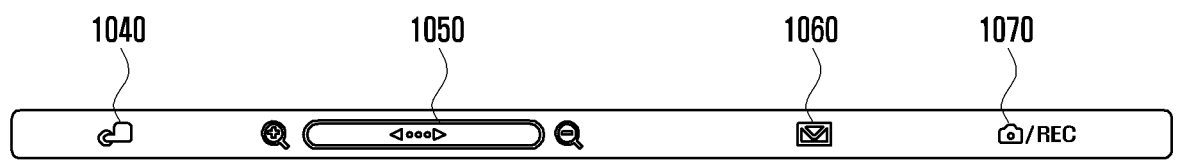

FIGS. 10A and 10B are diagrams illustrating a side surface of an electronic device according to various embodiments of the disclosure.

Referring to FIGS. 10A and 10B, the electronic device (e.g., the electronic device 300 of FIG. 3) may include an indicator disposed at a position corresponding to a disposition area (e.g., a side touch area) of at least one of a touch sensor (e.g., the touch sensor (or the pressure sensor) 710 of FIG. 7) and a fingerprint sensor (e.g., the fingerprint sensor 720 of FIG. 7). FIGS. 10A and 10B illustrate an indicator that emits light in a shape (e.g., icon shape) corresponding to a particular function. Although not shown, the electronic device may mold (e.g., molding of adding a member or molding of partially reducing a thickness) at least a partial area of a window corresponding to the side touch area to represent the indicator.

FIG. 10A illustrates one side member (the left side member 333 of FIG. 3) of an electronic device (e.g., the electronic device 300 of FIG. 3).

According to various embodiments, the electronic device (e.g., the electronic device 300 of FIG. 3) may include a volume up key 1010 and a volume down key 1020. For example, the electronic device (e.g., the electronic device 300 of FIG. 3) may detect a touch to the volume up key 1010 and the volume down key 1020 and adjust a sound volume. According to an embodiment, a touch sensor disposed at the volume up key 1010 and the volume down key 1020 may determine a magnitude of a touch pressure. The electronic device may perform, for example, at least another function in addition to a volume adjustment function according to a magnitude of a touch pressure generated in the volume up key 1010 and the volume down key 1020.

According to various embodiments, the electronic device (e.g., the electronic device 300 of FIG. 3) may include a custom key 1030. For example, the electronic device (e.g., the electronic device 300 of FIG. 3) may detect a touch to the custom key 1030 and set a function to perform in response to a touch to at least one (e.g., the volume up key 1010 and the volume down key 1020) of the side touch area. For example, the user may set a specific function to the custom key 1030.

FIG. 10B illustrates one side surface (e.g., the right side member 334 of FIG. 3) of the electronic device (e.g., the electronic device 300 of FIG. 3).

According to various embodiments, the electronic device (e.g., the electronic device 300 of FIG. 3) may include a fingerprint recognition key 1040. For example, the electronic device (e.g., electronic device 300 of FIG. 3) may detect a touch to the fingerprint recognition key 1040 and perform a user authentication procedure through comparison with registered fingerprint information.

According to various embodiments, the electronic device (e.g., the electronic device 300 of FIG. 3) may include a scroll/zoom key 1050. For example, the electronic device (e.g., the electronic device 300 of FIG. 3) may detect a touch and a touch gesture to the scroll/zoom key 1050 and perform a function corresponding thereto. For example, the electronic device (e.g., the electronic device 300 of FIG. 3) may scroll a web browser, photo, or document displaying in a display area in a direction corresponding to the touch gesture in response to recognition of a touch gesture that swipes upward or downward after touch detection to the scroll/zoom key 1050.

Further, in some embodiments, a touch sensor disposed at the scroll/zoom key 1050 may determine a magnitude of a touch pressure. The electronic device (e.g., the electronic device 300 of FIG. 3) may perform at least two functions based on the magnitude of a touch pressure. For example, the electronic device (e.g., the electronic device 300 of FIG. 3) may determine a touch pressure of a predetermined magnitude or more to the scroll/zoom key 1050 and zoom in or zoom out a web browser, photo, or document displaying in the display area to correspond to the touch gesture in response to recognition of a touch gesture that swipes upward or downward.

According to another embodiment, the electronic device (e.g., the electronic device 300 of FIG. 3) may enlarge or reduce a display screen in a direction corresponding to the touch gesture in response to detection of a touch gesture that swipes upward or downward after a touch to the scroll/zoom key 1050 occurs upon inputting using a stylus pen. As another example, the electronic device (e.g., the electronic device 300 of FIG. 3) may determine a touch pressure of a predetermined magnitude or more to the scroll/zoom key 1050 upon inputting using a stylus pen and adjust a thickness of a pen tip in a direction corresponding to the touch gesture in response to detection of a touch gesture that swipes upward or downward.

According to various embodiments, the electronic device (e.g., the electronic device 300 of FIG. 3) may include a message notification key 1060. For example, when a message is received and an unread message exists, the electronic device (e.g., the electronic device 300 of FIG. 3) may control an indicator corresponding to the message notification key 1060 to emit light. As another example, the electronic device (e.g., the electronic device 300 of FIG. 3) may detect a touch to the message notification key 1060 and display a received message in a display area.

According to various embodiments, the electronic device (e.g., the electronic device 300 of FIG. 3) may include a camera key 1070. For example, the electronic device (e.g., the electronic device 300 of FIG. 3) may detect a touch to the camera key 1070 and activate the camera. As another example, the electronic device (e.g., the electronic device 300 of FIG. 3) may change a still picture and moving picture photographing mode based on a magnitude of a touch pressure.

According to various embodiments, the electronic device (e.g., the electronic device 300 of FIG. 3) may provide user feedback based on detection of a touch in the side touch area and/or a touch pressure of a predetermined range. For example, the electronic device (e.g., the electronic device 300 of FIG. 3) may control driving of a motor therein and provide haptic feedback to the user in response to detection of a touch pressure of a threshold value or more and/or a touch in the side touch area.

According to various embodiments, the electronic device (e.g., the electronic device 300 of FIG. 3) may provide a user interface in response to detection of a touch in the side touch area and/or a touch gesture corresponding thereto. For example, the electronic device (e.g., the electronic device 300 of FIG. 3) may display a screen related to execution of the each function in a display area in response to detection of a touch in the side touch area and/or a touch gesture corresponding thereto.

The electronic device (e.g., the electronic device 300 of FIG. 3) according to various embodiments may include a housing including a first plate (the first plate 310 of FIG. 3) facing a first direction, a second plate (e.g., the second plate 320 of FIG. 3) facing a second direction opposite to the first direction, and a side member (e.g., the side member 330 of FIG. 3) enclosing a space between the first plate and the second plate, wherein the side member is attached to or formed integrally with at least one of the first plate and the second plate; a first touch panel (e.g., the first touch panel 431 of FIG. 4 or the first touch panel 641 of FIG. 6) positioned inside the housing and interposed between the display and the first plate or integrally formed with the display and including a first plurality of sensing elements having a first touch point density; a second touch panel (e.g., the second touch panel 432 of FIG. 4 or the second touch panel 642 of FIG. 6) adjacent to the side member, positioned inside the housing, oriented to face a portion of the side member, and including a second plurality of sensing elements having a second touch point density lower than the first touch point density; and a processor (e.g., the processor 120 of FIG. 1 or the processor 210 FIG. 2) positioned inside the housing and functionally connected to the display, the first touch panel, and the second touch panel.

The first plate of the electronic device (e.g., the electronic device 300 of FIG. 3) according to various embodiments may be made of glass, and the side member may be integrally with the first plate and be made of glass.

The electronic device (e.g., the electronic device 300 of FIG. 3) according to various embodiments may further include an FPCB including the second touch panel.

The first plurality of sensing elements of the electronic device (e.g., the electronic device 300 of FIG. 3) according to various embodiments may include a first plurality of sensing electrodes separated by the first distance, and the second plurality of sensing elements may include a second plurality of sensing electrodes separated by a second distance larger than the first distance.

The first plurality of sensing elements of the electronic device (e.g., the electronic device 300 of FIG. 3) according to various embodiments may include a first plurality of conductive lines separated by the first distance, and the second plurality of elements may include a second plurality of conductive lines separated by a second distance larger than the first distance.

The electronic device (e.g., the electronic device 300 of FIG. 3) according to various embodiments may further include a first adhesive layer that provides adhesive strength to couple at least one of the first touch panel and the second touch panel to the housing.

The electronic device (e.g., the electronic device 300 of FIG. 3) according to various embodiments may further include a second adhesive layer that provides adhesive strength to couple at least one of the first touch panel and the second touch panel to the display.

The FPCB of the electronic device (e.g., electronic device 300 of FIG. 3) according to various embodiments may include at least one of the touch sensor (e.g., the touch sensor (or the pressure sensor) 710 of FIG. 7), pressure sensor (e.g., the touch sensor (or the pressure sensor) 710 of FIG. 7), and fingerprint sensor (e.g., the fingerprint sensor 720 of FIG. 7).

The electronic device (e.g., the electronic device 300 of FIG. 3) according to various embodiments may further include a light source (e.g., the light source 660 of FIG. 6) disposed at a position corresponding to at least one of the touch sensor, pressure sensor, and fingerprint sensor and configured to emit light through the side member.

The electronic device (e.g., the electronic device 300 of FIG. 3) according to various embodiments may further include a waveguide (e.g., the waveguide 670 of FIG. 6) configured to emit light to a predetermined path.

The touch sensor of the electronic device (e.g., the electronic device 300 of FIG. 3) according to various embodiments may include a first electrode (e.g., the first electrode 810 of FIG. 8), a second electrode (e.g., the second electrode 820 of FIG. 8), and a dielectric layer (e.g., the dielectric layer 830 of FIG. 8) disposed between the first electrode and the second electrode.

In the window of the electronic device (e.g., the electronic device 300 of FIG. 3) according to various embodiments, a position corresponding to at least one of the touch sensor, pressure sensor, and fingerprint sensor may be embossing molded or engraving molded (e.g., the indicator 350 of FIG. 3).

Figure 11:
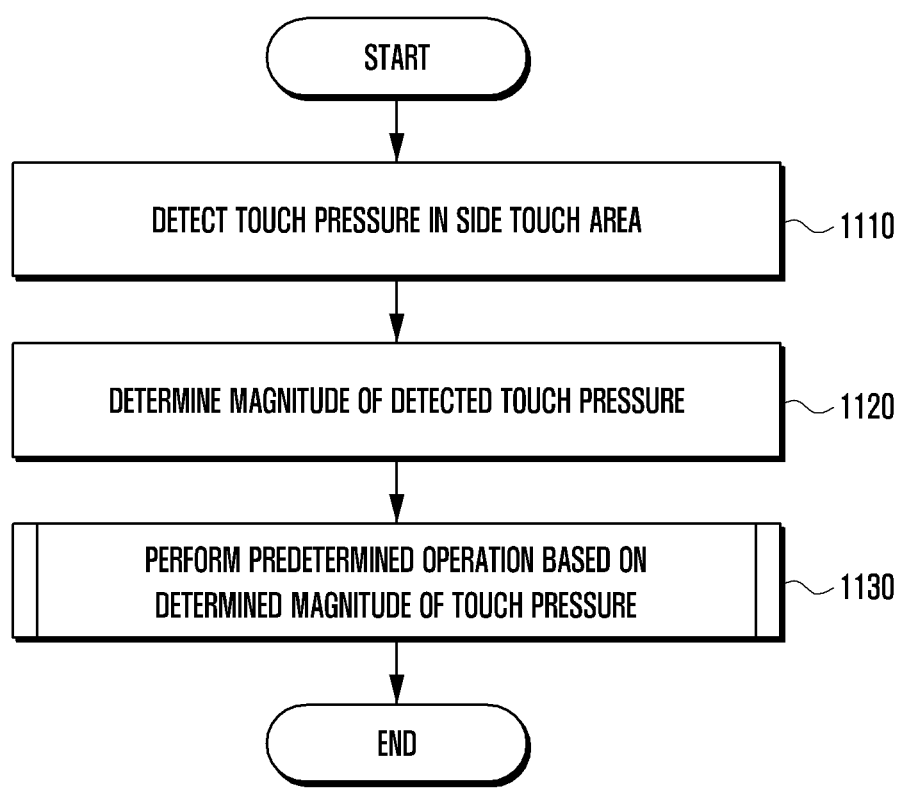
FIG. 11 is a flowchart illustrating a method of controlling an electronic device according to an embodiment of the disclosure.

FIG. 11 is a flowchart illustrating a method of controlling an electronic device according to an embodiment of the disclosure.

Referring to FIG. 11, the processor (e.g., the processor 120 of FIG. 1 or the processor 210 of FIG. 2) of the electronic device (e.g., the electronic device 101 of FIG. 1 or the electronic device 201 of FIG. 2) may detect a touch pressure in a side touch area through a second touch panel (e.g., the second touch panel 432 of FIG. 4 or the second touch panel 642 of FIG. 6), at operation 1110.

According to various embodiments, the processor may detect a touch pressure generated in the side touch area. For example, the second touch panel may include a first electrode, a second electrode, and a dielectric layer disposed between the first electrode and the second electrode. For example, the second touch panel may detect a change in a capacitance formed between the first electrode and the second electrode to detect a position and/or a pressure of a touch.

The processor (e.g., the processor 120 of FIG. 1 or the processor 210 of FIG. 2) of the electronic device (e.g., the electronic device 101 of FIG. 1 or the electronic device 201 of FIG. 2) may determine a magnitude of the detected touch pressure, at operation 1120. For example, a capacitance formed between the first electrode and the second electrode may increase with decrease of a distance between the first electrode and the second electrode. For example, when a large pressure occurs in the second touch panel, a capacitance increases and the processor may determine a magnitude of a touch pressure using the increased capacitance.

The processor (e.g., the processor 120 of FIG. 1 or the processor 210 of FIG. 2) of the electronic device (e.g., the electronic device 101 of FIG. 1 or the electronic device 201 of FIG. 2) may perform a predetermined operation based on the determined magnitude of the touch pressure, at operation 1130. For example, the electronic device may perform an operation mapped to a value of a capacitance formed between the first electrode and the second electrode.

Figure 12:
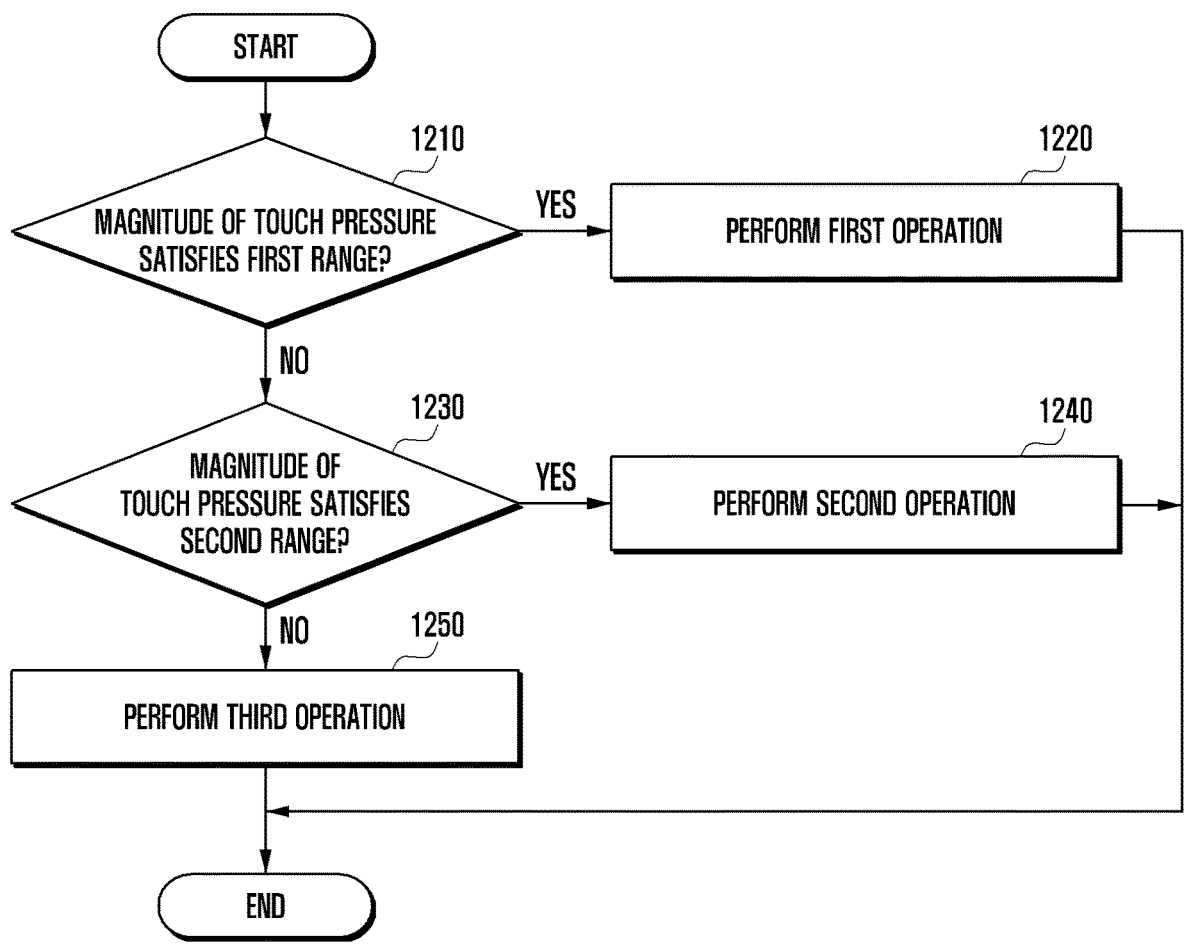
FIG. 12 is a flowchart illustrating a method of controlling an electronic device to perform different operations according to a magnitude of a touch pressure according to an embodiment of the disclosure.

FIG. 12 is a flowchart illustrating a method of controlling an electronic device to perform different operations according to a magnitude of a touch pressure according to an embodiment of the disclosure.

Referring to FIG. 12, the processor (e.g., the processor 120 of FIG. 1 or the processor 210 of FIG. 2) of the electronic device (e.g., the electronic device 101 of FIG. 1 or the electronic device 201 of FIG. 2) may determine whether the determined magnitude of the touch pressure satisfies a first range, at operation 1210. The first range may be, for example, a range from a value detected with a minimum touch pressure to less than a first threshold value.

If the determined magnitude of the touch pressure satisfies a first range, the processor (e.g., the processor 120 of FIG. 1 or the processor 210 of FIG. 2) of the electronic device (e.g., the electronic device 101 of FIG. 1 or the electronic device 201 of FIG. 2) may perform a first operation, at operation 1220. For example, the processor may determine whether a touch pressure to a volume down key (e.g., the volume down key 1020 of FIG. 10A) and/or a volume up key (e.g., the volume up key 1010 of FIG. 10A) satisfies the first range, and if a touch pressure to a volume down key (e.g., the volume down key 1020 of FIG. 10A) and/or a volume up key (e.g., the volume up key 1010 of FIG. 10A) satisfies the first range, the processor may adjust a volume of an output sound.

If the determined magnitude of the touch pressure does not satisfy the first range, the processor (e.g., the processor 120 of FIG. 1 or the processor 210 of FIG. 2) of the electronic device (e.g., the electronic device 101 of FIG. 1 or the electronic device 201 of FIG. 2) may determine whether the determined magnitude of the touch pressure satisfies a second range, at operation 1230. The second range may be, for example, a range of a first threshold value or more. Further, in some embodiments, the second range may be a range from the first threshold value or more to less than a second threshold value.

If the determined magnitude of the touch pressure satisfies a second range, the processor (e.g., the processor 120 of FIG. 1 or the processor 210 of FIG. 2) of the electronic device (e.g., the electronic device 101 of FIG. 1 or the electronic device 201 of FIG. 2) may perform a second operation, at operation 1240. For example, the electronic device may determine whether a touch pressure to the volume up key (e.g., the volume up key 1010 of FIG. 10A) and/or the volume down key (e.g., the volume down key 1020 of FIG. 10A) satisfies a second range, and if a touch pressure to the volume up key (e.g., the volume up key 1010 of FIG. 10A) and/or the volume down key (e.g., the volume down key 1020 of FIG. 10A) satisfies a second range, the electronic device may remove an output sound or may pause an output sound.

If the determined magnitude of the touch pressure does not satisfy a second range, the electronic device may perform a third operation, at operation 1250. For example, if the second range is a range of a first threshold value or more, a case that does not satisfy the first range or the second range does not occur; thus, the electronic device may not perform a third operation. As another example, if the second range is a range from the first threshold value or more to less than a second threshold value, when the determined magnitude of the touch pressure is larger than the second threshold value; thus, the electronic device (e.g., the electronic device 101 of FIG. 1 or the electronic device 201 of FIG. 2) may perform a third operation distinguished from the first operation and the second operation.

According to various embodiments, the processor (e.g., the processor 120 of FIG. 1 or the processor 210 of FIG. 2) of the electronic device (e.g., the electronic device 101 of FIG. 1 or the electronic device 201 of FIG. 2) may recognize the same touch gesture to another input based on the determined magnitude of the touch pressure. For example, when the determined magnitude of the touch pressure satisfies the first range and when the processor detects a touch gesture that swipes upward or downward in a scroll/zoom area (e.g., the scroll/zoom key 1050 of FIG. 10B), the processor may scroll a screen (e.g., web browser, photo, or document) displaying in a display area in a direction corresponding to the touch gesture. As another example, when the determined magnitude of the touch pressure satisfies a second range and when the processor detects a touch gesture that swipes upward or downward in the scroll/zoom area (e.g., the scroll/zoom key 1050 of FIG. 10B), the processor may zoom in or zoom out a screen (e.g., web browser, photo, or document) displaying in the display area to correspond to the touch gesture.

According to various embodiments, when the determined magnitude of the touch pressure satisfies a first range or a second range, the processor (e.g., the processor 120 of FIG. 1 or the processor 210 of FIG. 2) of the electronic device (e.g., the electronic device 101 of FIG. 1 or the electronic device 201 of FIG. 2) may provide user feedback and/or a user interface.

Figure 13:
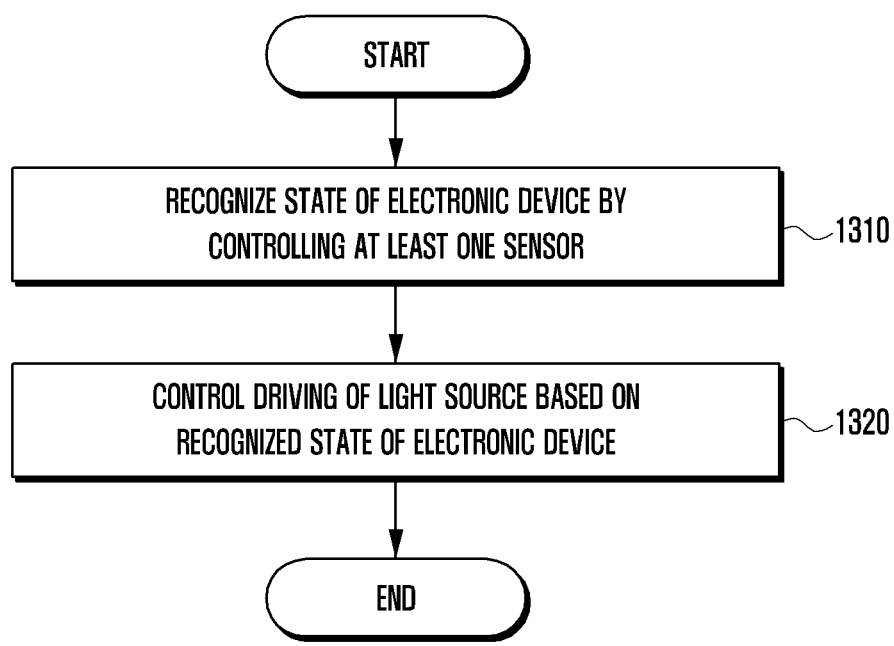
FIG. 13 is a flowchart illustrating a method of controlling an electronic device according to an embodiment of the disclosure.

FIG. 13 is a flowchart illustrating a method of controlling an electronic device according to an embodiment of the disclosure.

Referring to FIG. 13, the electronic device (e.g., the electronic device 101 of FIG. 1 or the electronic device 201 of FIG. 2) may include an indicator disposed at a position corresponding to a side touch area. For example, the electronic device (e.g., the electronic device 101 of FIG. 1 or the electronic device 201 of FIG. 2) may include an indicator that emits light.

Referring to FIG. 13, the processor (e.g., the processor 120 of FIG. 1 or the processor 210 of FIG. 2) of the electronic device (e.g., the electronic device 101 of FIG. 1 or the electronic device 201 of FIG. 2) may control at least one sensor to recognize a state of the electronic device, at operation 1310. For example, the electronic device may determine a direction of gravity using a gyro sensor included therein and recognize a state of the electronic device. Further, in some embodiments, the electronic device may determine a direction of external light (e.g., sunlight and artificial light disposed at a ceiling) using an illumination sensor and recognize a state thereof.

The processor (e.g., the processor 120 of FIG. 1 or the processor 210 of FIG. 2) of the electronic device (e.g., the electronic device 101 of FIG. 1 or the electronic device 201 of FIG. 2) may control driving of the light source based on the recognized state of the electronic device, at operation 1320. For example, the processor may recognize a state in which a display of the electronic device faces the floor and provide a notification to the user through the light source. More particularly, the electronic device may control driving of the light source corresponding to a message notification key (e.g., the message notification key 1060 of FIG. 10B) and provide a notification to the user based on reception of the message or existence of an unread message.

Figure 14:
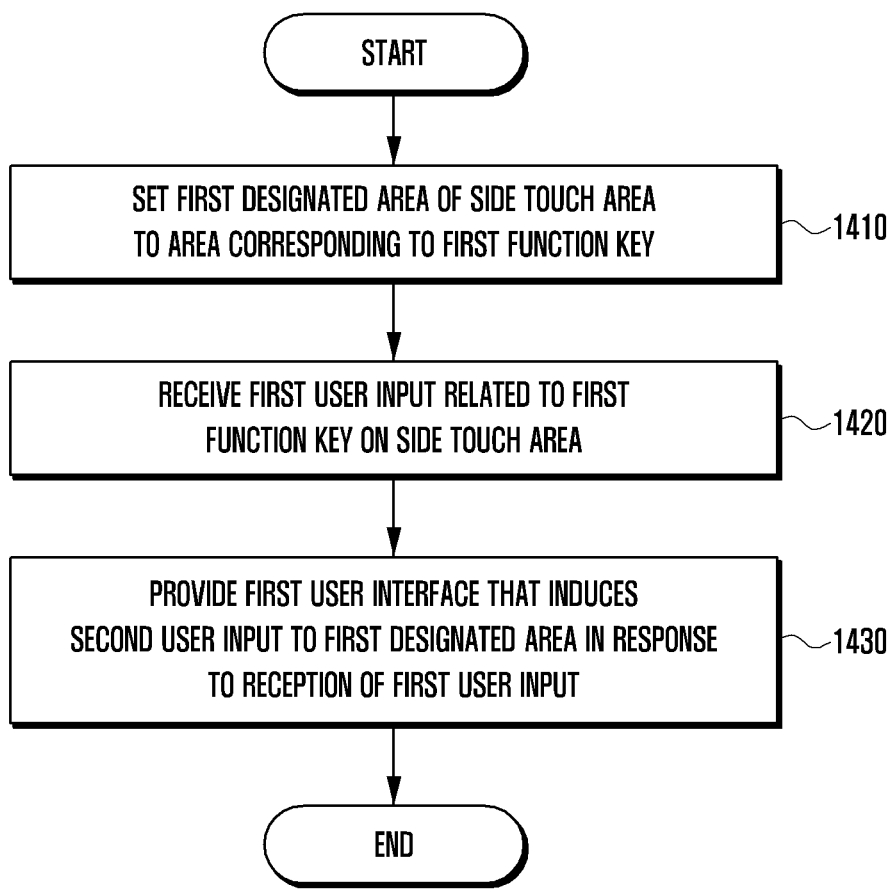
FIG. 14 is a flowchart illustrating a method of controlling an electronic device according to an embodiment of the disclosure.

FIG. 14 is a flowchart illustrating a method of controlling an electronic device according to an embodiment of the disclosure.

The electronic device including a key function in a side touch area may provide an indicator on an area corresponding to the function key to induce a user input to the function key. As another example, the electronic device may induce a user input to a function key area through another user interface in addition to a side indicator.

Referring to FIG. 14, the processor (e.g., the processor 120 of FIG. 1 or the processor 210 of FIG. 2) of the electronic device (e.g., the electronic device 101 of FIG. 1 or the electronic device 201 of FIG. 2) may set a first designated area of the side touch area to an area corresponding to a first function key, at operation 1410.

According to various embodiments, the first designated area may be a fixed area or a variable area. For example, when the side touch area is formed by a touch sensor (or a pressure sensor), the first designated area may be fixed to an area corresponding to the touch sensor (or the pressure sensor). As another example, the side touch area may include a touch panel formed integrally, and in this case, the first designated area may be changed to various areas designated by the user or the electronic device.

According to various embodiments, the electronic device may set a plurality of areas to correspond to a plurality of function keys, respectively. For example, the electronic device may set a second designated area of the side touch area to an area corresponding to a second function key and set a third designated area to an area corresponding to a third function key.

The processor (e.g., the processor 120 of FIG. 1 or the processor 210 of FIG. 2) of the electronic device (e.g., the electronic device 101 of FIG. 1 or the electronic device 201 of FIG. 2) may receive a first user input related to the first function key on the side touch area, at operation 1420.

A first user input related to the first function key may include, for example, a proximity input and/or a touch input through a first designated area or a predetermined area including the first designated area. As another example, the electronic device may designate in advance any specific area on the side touch area to be related to function keys. For example, when a proximity input and/or a touch input through the specific area is detected, it may be determined that a user input related to the first function key has been received.

According to various embodiments, the first user input may include a touch gesture input. The first user input may include, for example, a slide input or a tab input. More specifically, a slide input and/or a tap input through the first designated area or a predetermined area including the first designated area may be designated in advance to be related to a first function key.

According to various embodiments, the first user input may be related to a plurality of function keys. For example, in an electronic device including a first function key and a second function key, the first function key and the second function key may be related simultaneously to the first user input based on a distance between the both keys or a performing function. For example, because a volume up key and a volume down key perform a related function, when a first user input related to a function key of any one of the both keys is detected, the electronic device may determine the first user input to a user input related to both the volume up key and the volume down key. Further, even if the first function key and the second function key perform an unrelated function, when a distance between the first function key and the second function key is small, the first user input may be related to both the first function key and the second function key, and the electronic device may determine the first user input to be related to a plurality of function keys.

The processor (e.g., the processor 120 of FIG. 1 or the processor 210 of FIG. 2) of the electronic device (e.g., the electronic device 101 of FIG. 1 or the electronic device 201 of FIG. 2) may provide a first user interface that induces a second user input to the first designated area in response to reception of the first user input at, operation 1430.

According to various embodiments, the first user interface may be provided to the user through the front display area. For example, by displaying an indicator through at least a partial area of a front display area corresponding to the first designated area, the second user input may be induced to the first designated area.

According to various embodiments, the processor may receive a second user input on the first designated area and perform a function according to the first function key and the second user input. In this case, the second user input may be designated to be related to the first function key. For example, when the first function key is a camera key (e.g., the camera key 1070 of FIG. 10B), the second user input may be designated to include a touch input in the first designated area or a touch pressure of a threshold value or more. Further, when the first function key is a scroll/zoom key (e.g., the scroll/zoom key 1050 of FIG. 10B), the second user input may be designated to include a touch gesture that swipes upward or downward after a touch occurring on the scroll/zoom key.

According to various embodiments, the electronic device may provide user feedback in response to reception of a second user input. For example, the electronic device may control driving of a motor therein to provide haptic feedback to the user.

According to various embodiments, the electronic device may provide a second user interface in response to execution of functions according to the first function key and the second user input. The second user interface may include, for example, display of a screen related to execution of the function through the front display area.

According to various embodiments, the electronic device may determine that the first user input is related to a plurality of function keys and provide a first user interface that induces a second user input to one of the plurality of function keys. For example, in an electronic device including a first function key and a second function key, when a first user input is related to both the first function key and the second function key, the electronic device may provide the first user interface that induces the second user input to one of the first designated area and the second designated area.

Figure 15A:
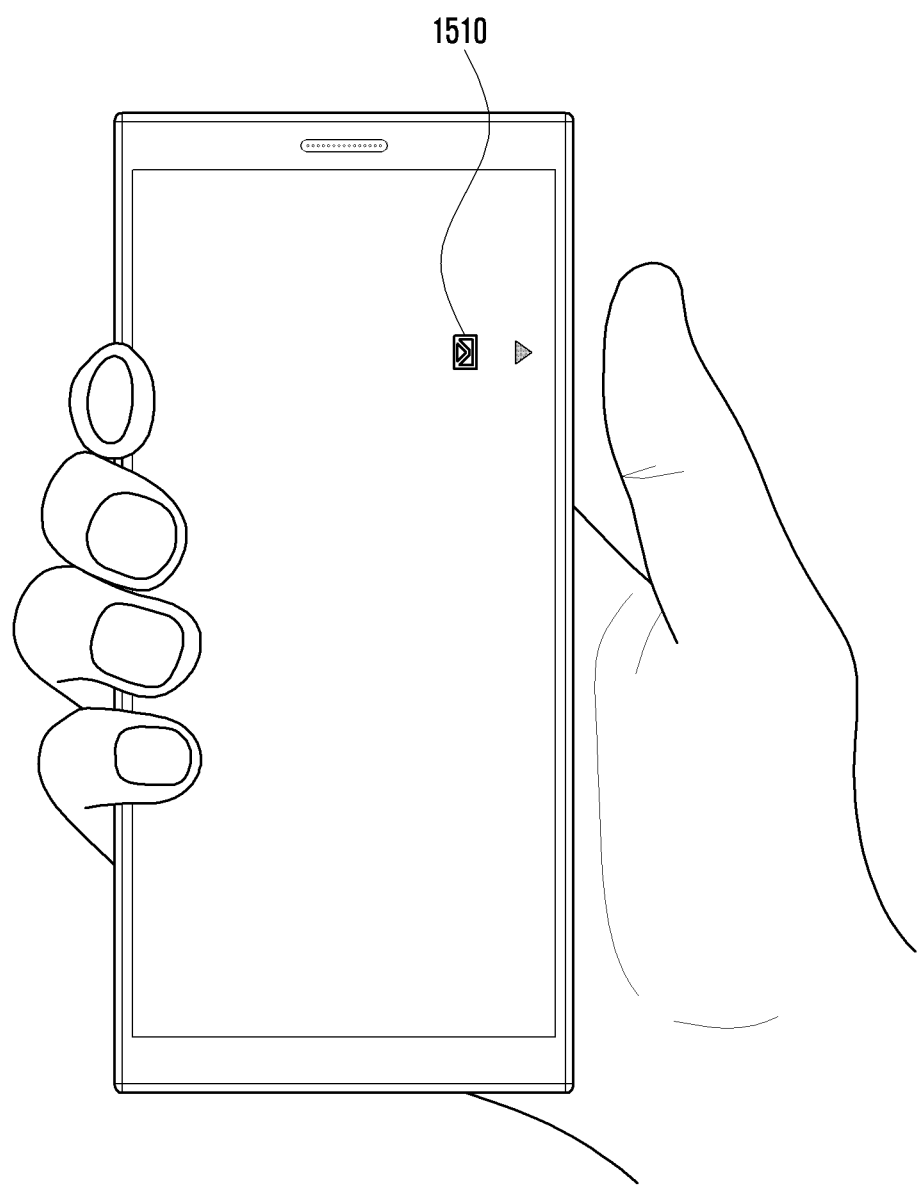
FIGS. 15A and 15B are diagrams illustrating a first user interface according to various embodiments of the disclosure.
Figure 15B:
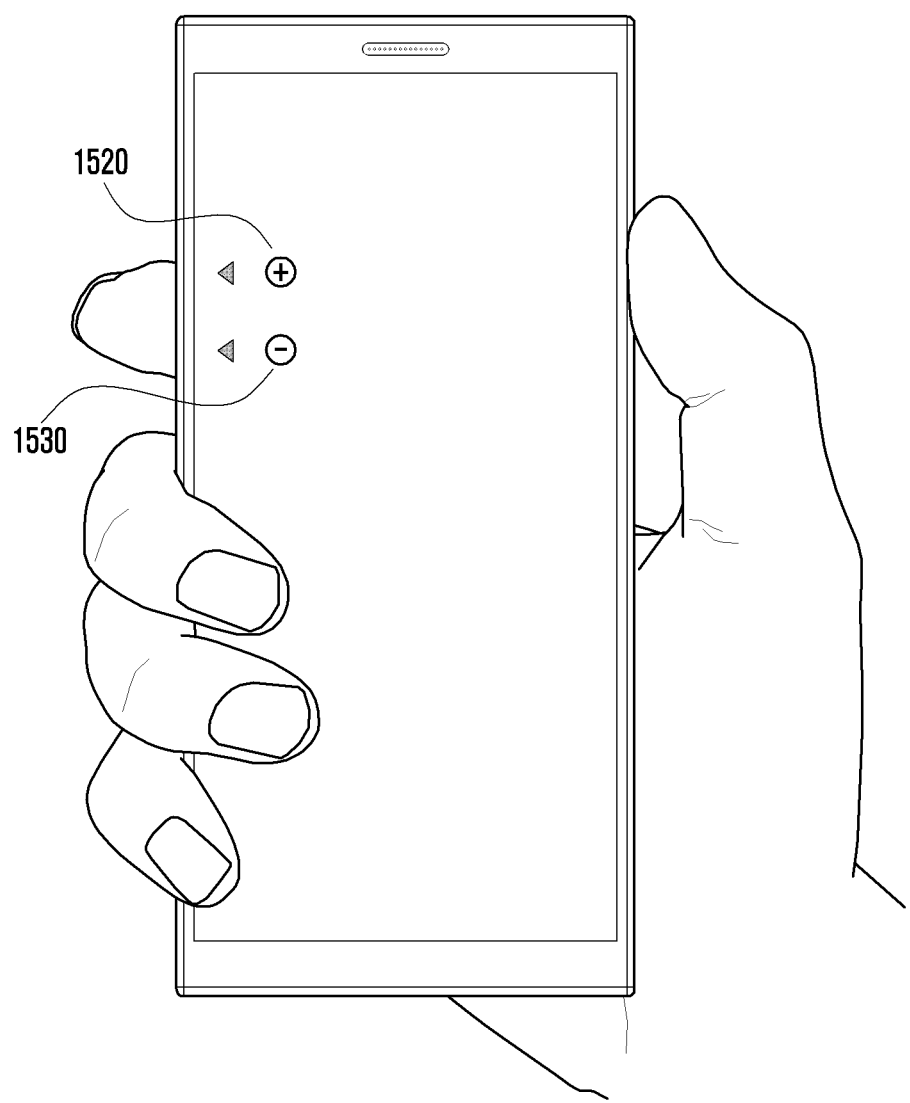

FIGS. 15A and 15B are diagrams illustrating a first user interface according to various embodiments of the disclosure.

Referring to FIGS. 15A and 15B, the electronic device may receive a predetermined first user input and provide an indicator 1510 corresponding to a first function key through a portion of a front display area. The user may determine a first designated area based on the indicator 1510.

FIG. 15B illustrates a case in which a function key related to the first user input is the plural. For example, the first function key and a second function key may be related to each other based on a distance between both function keys or a performing function. For example, a volume up key (e.g., the volume up key 1010 of FIG. 10A) and a volume down key (e.g., the volume down key 1020 of FIG. 10A) may perform a related function, but may be divided to operate as a separate function key. In this case, the electronic device may receive a first user input related to the volume up key and provide both an indicator 1520 corresponding to the volume up key and an indicator 1530 corresponding to the volume down key through the front display area.

Further, in some embodiments, even if the first function key and the second function key perform an unrelated function, a distance between the first function key and the second function key is small; thus, a first user input may be related to both the first function key and the second function key. For example, in an area related to both the first function key and the second function key, when a first user input is received, the electronic device may provide both an indicator corresponding to the first function key and an indicator corresponding to the second function key through the front display area.

Figure 16:
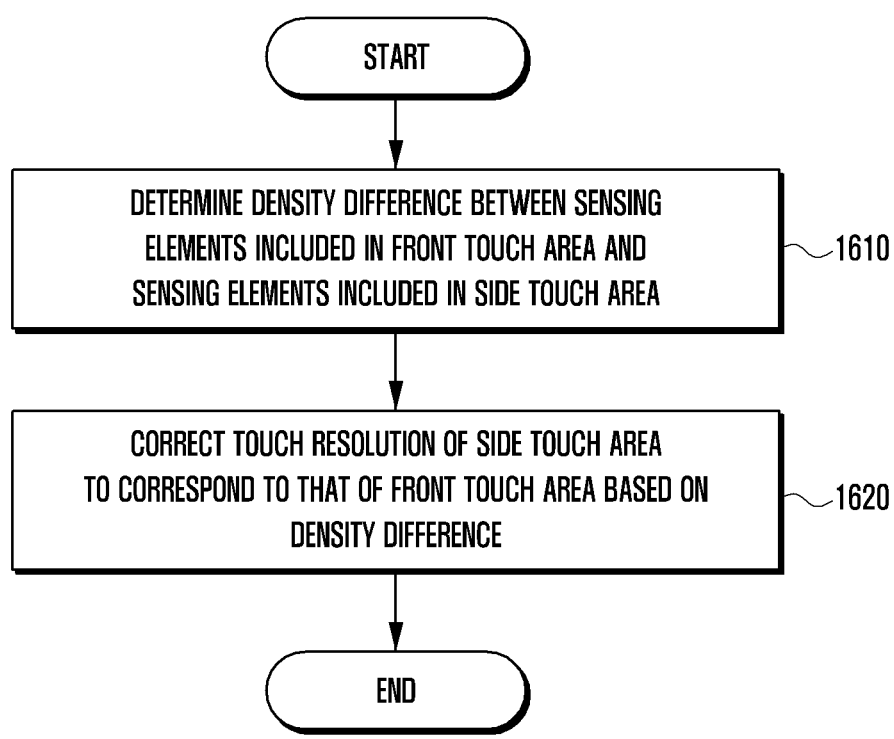
FIG. 16 is a flowchart illustrating a method of controlling an electronic device according to various embodiments of the disclosure.

FIG. 16 is a flowchart illustrating a method of controlling an electronic device according to an embodiment of the disclosure.

Referring to FIG. 16, the processor (e.g., the processor 120 of FIG. 1 or the processor 210 of FIG. 2) of the electronic device (e.g., the electronic device 101 of FIG. 1 or the electronic device 201 of FIG. 2) may determine a density difference between sensing elements included in the front touch area and sensing elements included in the side touch area, at operation 1610.

According to various embodiments, the side touch area may include sensing elements in a density lower than that of the front touch area. For example, the front touch area may form touch coordinates five times more tightly than the side touch area.

The processor (e.g., the processor 120 of FIG. 1 or the processor 210 of FIG. 2) of the electronic device (e.g., the electronic device 101 of FIG. 1 or the electronic device 201 of FIG. 2) may correct a touch resolution of the side touch area to correspond to that of the front touch area based on the density difference, at operation 1620.

For example, when the front touch area forms touch coordinates five times more tightly than the side touch area, one pixel movement in the side touch area may be corrected to correspond to 5 pixel movements in the front touch area.

An electronic device (e.g., the electronic device 101 of FIG. 1 or the electronic device 201 of FIG. 2) according to various embodiments includes a display (e.g., the display 311 of FIG. 3) configured to form a front display area; a touch panel layer (e.g., the touch panel layer 430 of FIG. 4 or the touch panel layer 640 of FIG. 6) configured to form a front touch area and a side touch area; a memory (e.g., the memory 130 of FIG. 1 or the memory 230 of FIG. 2) configured to store instructions; and a processor (e.g., the processor 120 of FIG. 1 or the processor 210 of FIG. 2) electrically connected to the display, the touch panel layer, and the memory, wherein the processor sets a first point of the side touch area to a first function key area, determines a first plurality of touch coordinates within a first designated distance from the first point, and enables the first function key area to include the first plurality of touch coordinates.

The processor of the electronic device according to various embodiments may receive a user input that sets a second function key, set a second point of the side touch area to a second function key area based on the user input, determine the second plurality of touch coordinates within a second designated distance from the first point and a third plurality of touch coordinates within the second designated distance from the second point, enable the first function key area to include a plurality of touch coordinates, and enable the second function key area to include the third plurality of touch coordinates.

The processor of the electronic device according to various embodiments may determine a density difference between sensing elements included in the front touch area and sensing elements included in the side touch area and correct a touch resolution of the side touch area to correspond to that of the front touch area based on the density difference.

The processor of the electronic device according to various embodiments may control the touch panel layer to detect a touch pressure to the function key area, determine a magnitude of the detected touch pressure, perform a first operation when the determined magnitude of the touch pressure satisfies a first range, and perform a second operation when the determined magnitude of the touch pressure satisfies a second range.

A method of controlling an operation of an electronic device including a front display area, a front touch area, and a side touch area according to various embodiments includes setting a first point of the side touch area to a first function key area; determining a first plurality of touch coordinates within a first designated distance from the first point; and enabling the first function key area to include the first plurality of touch coordinates, and wherein the side touch area includes sensing elements with a density lower than that of the front touch area.

A method of controlling an operation of an electronic device including a front display area, a front touch area, and a side touch area according to various embodiments includes receiving a user input that sets a second function key; setting a second point of the side touch area to a second function key area based on the user input; determining a second plurality of touch coordinates within a second designated distance from the first point and a third plurality of touch coordinates within the second designated distance from the second point; and enabling the first function key area to include the second plurality of touch coordinates and enabling the second function key area to include the third plurality of touch coordinates.

A method of controlling an operation of an electronic device including a front display area, a front touch area, and a side touch area according to various embodiments includes determining a density difference between sensing elements included in the front touch area and sensing elements included in the side touch area; and correcting a touch resolution of the side touch area to correspond to that of the front touch area based on the density difference.

A method of controlling an operation of an electronic device including a front display area, a front touch area, and a side touch area according to various embodiments may include detecting a touch pressure to a function key area; determining the determined magnitude of the touch pressure; performing, when the determined magnitude of the touch pressure satisfies a first range, a first operation; and performing, when the determined magnitude of the touch pressure satisfies a second range, a second operation.

In the disclosure, the term "module" refers to a unit including hardware, software, firmware or a combination thereof. For example, the term "module" is interchangeable with the terms "unit," "logic," "logical block," "component," "circuit," or the like. The term "module" may indicate the smallest unit or a part of an integrated component. The term "module" may indicate the smallest unit or a part thereof that can perform one or more functions. The term "module" may indicate a unit that may be implemented in mechanical or electronic mode. For example, the term "module" may indicate a unit that includes at least one of an application specific integrated circuit (ASIC), a field-programmable gate array (FPGA) and a programmable-logic device that can perform functions that are known or will be developed.

At least part of the method (e.g., operations) or devices (e.g., modules or functions) according to various embodiments of the disclosure may be implemented with instructions that can be conducted via various types of computers and stored in non-transitory computer-readable storage media, as types of programming modules, for example. One or more processors (e.g., the processor 120) can execute command instructions, thereby performing the functions. An example of the non-transitory computer-readable storage media may be the memory 130.

Examples of non-transitory computer-readable storage media include magnetic media, such as hard disks, floppy disks, and magnetic tape; optical media such as compact disc ROM (CD-ROM) disks and DVDs; magneto-optical media, such as floptical discs; and hardware devices such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules to perform the operations of various embodiments described above, or vice versa.

Modules or programming modules according to various embodiments of the disclosure may include one or more components, remove part of them described above, or further include new components. The operations performed by modules, programming modules, or other components, may be executed in serial, parallel, repetitive or heuristic fashion. Part of the operations can be executed in any other order, skipped, or executed with additional operations.

An electronic device according to various embodiments of the disclosure can reduce a bezel area and extend a touch area thereof, thereby effectively performing various user inputs.

An electronic device according to various embodiments of the disclosure can omit a key button disposed at a side space, thereby increasing a commercial value according an aesthetic impression and utility.

While the disclosure has been described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a housing comprising:
a first plate facing a first direction,
a second plate facing a second direction opposite to the first direction, and
a side member enclosing a space between the first plate and the second plate, the side member being attached to or integrally formed with at least one of the first plate or the second plate;
a display positioned inside the housing and configured to form a display area through the first plate;
a first touch panel positioned inside the housing and interposed between the display and the first plate or integrally formed with the display, the first touch panel comprising a first plurality of sensing elements having a first touch point density;
a second touch panel positioned inside the housing, the second touch panel being adjacent to the side member and oriented to face a portion of the side member, the second touch panel comprising a second plurality of sensing elements having a second touch point density lower than the first touch point density; and
a processor positioned inside the housing and functionally connected to the display, the first touch panel, and the second touch panel.

2. The electronic device of claim 1, further comprising a flexible printed circuit board (FPCB) comprising the second touch panel.

3. The electronic device of claim 2, wherein the FPCB comprises at least one of a touch sensor, a pressure sensor, or a fingerprint sensor.

4. The electronic device of claim 3, further comprising:
a light source disposed at a position corresponding to at least one of the touch sensor, the pressure sensor, or the fingerprint sensor,
wherein the light source is configured to emit light through the side member.

5. The electronic device of claim 4, further comprising a waveguide configured to emit light to a predetermined path.

6. The electronic device of claim 3, wherein the pressure sensor comprises:
a first electrode;
a second electrode; and
a dielectric layer disposed between the first electrode and the second electrode.

7. The electronic device of claim 3, wherein in a window, a position corresponding to at least one of the touch sensor, the pressure sensor, and the fingerprint sensor is embossing molded or engraving molded.

8. The electronic device of claim 1, wherein at least one of the first touch panel and the second touch panel further comprises a first adhesive layer configured to provide adhesive strength to couple to the housing.

9. The electronic device of claim 8, wherein at least one of the first touch panel and the second touch panel further comprises a second adhesive layer configured to provide adhesive strength to couple to the display.

10. The electronic device of claim 1, wherein the first plate is made of glass, and the side member is formed integrally with the first plate and is made of glass.

11. The electronic device of claim 1,
wherein the first plurality of sensing elements comprise a first plurality of sensing electrodes separated by a first distance, and
wherein the second plurality of sensing elements comprise a second plurality of sensing electrodes separated by a second distance larger than the first distance.

12. The electronic device of claim 1,
wherein the first plurality of sensing elements comprise a first plurality of conductive lines separated by a first distance, and
wherein the second plurality of sensing elements comprise a second plurality of conductive lines separated by a second distance larger than the first distance.

* * * * *